United States Patent
Cooper et al.

(10) Patent No.: US 8,340,405 B2
(45) Date of Patent: Dec. 25, 2012

(54) SYSTEMS AND METHODS FOR SCALABLE MEDIA CATEGORIZATION

(75) Inventors: Matthew Cooper, Palo Alto, CA (US); Dong Wang, Beijing (CN)

(73) Assignee: Fuji Xerox Co., Ltd., Tokyo (JP)

( * ) Notice: Subject to any disclaimer, the term of this patent is extended or adjusted under 35 U.S.C. 154(b) by 987 days.

(21) Appl. No.: 12/353,212

(22) Filed: Jan. 13, 2009

(65) Prior Publication Data

US 2010/0177956 A1    Jul. 15, 2010

(51) Int. Cl.
   *G06K 9/62* (2006.01)
   *G06K 9/46* (2006.01)
   *G06K 9/66* (2006.01)
(52) U.S. Cl. ............... 382/159; 382/190; 382/224
(58) Field of Classification Search .......... 382/118, 382/155–161, 190, 224; 700/47–48; 706/2, 706/15
See application file for complete search history.

(56) References Cited

U.S. PATENT DOCUMENTS

| | | | | |
|---|---|---|---|---|
| 5,579,471 | A * | 11/1996 | Barber et al. | 715/700 |
| 5,647,058 | A * | 7/1997 | Agrawal et al. | 1/1 |
| 6,389,424 | B1 * | 5/2002 | Kim et al. | 1/1 |
| 7,590,310 | B2 * | 9/2009 | Retterath et al. | 382/305 |
| 7,876,965 | B2 * | 1/2011 | Ai et al. | 382/226 |
| 7,907,755 | B1 * | 3/2011 | Perlmutter et al. | 382/118 |
| 2005/0097435 | A1 * | 5/2005 | Prakash et al. | 715/500 |

OTHER PUBLICATIONS

Frigui et al, Unsupervised Image Segmentation and Annotation for Content-Based Image Retrieval, 2006 IEEE International Conference on Fuzzy Systems Sheraton Vancouver Wall Centre Hotel, Vancouver, BC, Canada Jul. 16-21, 2006.*

Arya, S. et al., "An Optimal Algorithm for Approximate Nearest Neighbor Searching in Fixed Dimensions," Publications Dept, ACM Inc, New York, NY, 1994, 33 pages, available http://www.cs.umd.edu/~mount/Papers/dist.pdf.

Baluja, S., Automated Image-Orientation Detection: A Scalable Boosting Approach, Pattern Anal Applic., (2007) vol. 10, pp. 247-263.

Fradkin, D. et al., "Experiments with Random Projections for Machine Learning," Division of Computer and Information Sciences Rutgers University Piscataway, NJ, 2002, 8 pgs.

Pham, M., et al., "Online Learning Asymmetric Boosted Classifiers for Object Detection," Proceedings of the IEEE Conference on Computer Vision and Pattern Recognition (CVPR), Minneapolis, MN, 2007, 8 pgs.

(Continued)

*Primary Examiner* — Vu Le
*Assistant Examiner* — Andrae S Allison
(74) *Attorney, Agent, or Firm* — Morgan, Lewis & Bockius LLP

(57) ABSTRACT

Systems and methods for automating digital file classification are described. The systems and methods include generating a plurality of classifiers from a plurality of first features of a plurality of first digital files, each of the plurality of first digital files having one or more associated annotations. A plurality of second features extracted from a plurality of second digital files is sorted according to the plurality of classifiers. A distance vector is determined between the second features and respective first features for the corresponding ones of the classifiers and the determined distances are ranked. A subset of matched files is selected based on the ranking. The subset of matched files correspond to respective one or more associated annotations. One or more annotations associated with the subset of matched files are associated to subsequently received digital files using the corresponding ones of the classifiers.

18 Claims, 15 Drawing Sheets

OTHER PUBLICATIONS

Schapire, R., et al. BoosTexter: A Boosting-based System for Text Categorization, Machine Learning, 39, (2/3):2000, pp. 135-168.

Snoek, C., et al., "The Challenge Problem for Automated Detection of 101 Semantic Concepts in Multimedia," ISLA, Informatics Institute, University of Amsterdam, Kruislaan 403, The Netherlands, Oct. 2006, pp. 421-430.

Torralba, A., et al., "80 Million Tiny Images: A Large Data Set for Nonparametric Object and Scene Recognition," IEEE Transactions on Pattern Analysis and Machine Intelligence, vol. 30, No. 11, Nov. 2008, pp. 1958-1970.

Yan, R., et al., "Model-Shared Subspace Boosting for Multi-label Classification," Research Track Paper, Aug. 2007, pp. 834-843.

\* cited by examiner

|  | 671 |
|---|---|
| 673-1 → Candidate A | Distance 1 |
| 673-2 → Candidate C | Distance 2 |
| 673-3 → Candidate E | Distance 3 |
| 673-n → ⋮ | ⋮ |

| Best Matched | Vote |   |
|---|---|---|
| 683-1 → Candidate A | 0 | 682-1 |
| 683-2 → Candidate C | 1 | 682-2 |
| 683-3 → Candidate E | 1 | 682-3 |
| 683-n → ⋮ | ⋮ | 682-n |

FIG. 6D

SYSTEMS AND METHODS FOR SCALABLE MEDIA CATEGORIZATION

TECHNICAL FIELD

The present invention relates generally to classifying multimedia files, and more particularly to systems and methods for automating multi-class multi-label digital media annotation.

BACKGROUND

With the proliferation of the internet and digital photography, a challenge in the field of computer vision and image processing has been scalability. Large-scale image media collections containing billions of image files are difficult to organize, navigate and retrieve accurately and efficiently. Recent multimedia analysis research has focused on information retrieval of digital content. Such indexing and retrieval can be enhanced and facilitated with tags or annotations. While manually supplied annotations are proliferating on websites such as YouTube and Flickr, the tremendous growth in individual and distributed media collections require automatic or semi-automatic tools for annotation.

Thus, a scalable approach to media categorization is highly desired. The abundance of human-annotated data from the various websites provides an unlimited source of sample data for constructing a scalable media categorization system. One approach to constructing a scalable classification system is to leverage commonly available large scale training data by extracting improved standard features and calculating nearest neighborhood (NN) based indices to generate low-level representations of the training data to, for example, automate the annotation of data files. The disadvantage of the nearest neighbor approach, however, is the computational complexity of standard implementations that result in inefficient processing due to the large collection of files. Thus, the trade-off for using a large library of freely available annotated files is the efficiency in processing such a collection.

Therefore, there is a need for a high performance scalable media classification scheme for annotating large-scale media files with significant computational savings and improved efficiency. There is also a need for adapting annotated collections, trained against a large collection of media files, to customize more limited training collections and specific annotation vocabularies.

SUMMARY

In some embodiments, a computer implemented method for annotating digital files is described. A set of (base) classifiers is generated from a plurality of first features of a plurality of first (training) digital files. Each of the plurality of first digital files is associated with one or more annotations. A plurality of second features extracted from a plurality of second (test) digital files is sorted according to the plurality of classifiers. A distance vector is determined between the second features and respective first features for the corresponding ones of the classifiers and ranked according to the determined distances. A subset of matched files is selected based on the ranking. The subset of matched files corresponds to respective one or more associated annotations. One or more annotations from the annotations respectively associated with the subset of matched files are associated to the at least one of the plurality of second digital files using the corresponding ones of the classifiers. Additionally, subsequently received digital files may be associated with one or more annotations from the annotations associated with the subset of matched files using the corresponding ones of the classifiers.

In some embodiments, a method for automating digital image file annotation is described. A plurality of first features is extracted from each of a plurality of first image files, each of the first image files having one or more associated annotations. For each of the first image files the first features are partitioned into a plurality of subsets of the first features. A plurality of classifiers is formed for each of the subsets of the first features. A plurality of second features is extracted from each of a plurality of second image files. For the second image files the second features are partitioned into a plurality of subsets of the second features. The plurality of the subsets of the second features are sorted using corresponding ones of the classifiers and a distance between respective subsets of the second features and the first features are determined for the corresponding ones of the classifiers. Based on distances for all subsets of a particular one of the second image files, which of the first image files is a match from a subset of matched files to a particular one or more of the classifiers is determined. One or more annotations derived from the matched first image files in the subset of matched files are associated with the particular one of the second image files.

In some embodiments, a method for automating image file classification is described. A plurality of first features from each of a plurality of first image files is extracted. Each of the first image files has one or more associated annotations. The first features for each of the first image files are partitioned into a first plurality of subsets of the features. A classifier for each of the first plurality of subsets of the features is formed, wherein each classifier corresponds to the respective subset of features from each of the plurality of first image files. A plurality of second features is extracted from each of a plurality of second image files. For each of the second image files the second features are partitioned into a second plurality of subsets of features. For each subset of the second plurality of subsets a distance between respective subsets of the second features and the first features are determined using corresponding ones of the classifiers. Based on distances for subsets of a particular second image file, which of the image files is a match from a subset of matched files to a particular one or more of the classifiers is determined.

In other embodiments, a system for automating digital file annotation is described. The system includes one or more processors, memory, and software modules stored in the memory. The software modules, which are executable by the one or more processors, include a first classification module and at least a second classification module. The first classification module is configured to extract one or more features from each of a first plurality of digital files and partition the features into a plurality of subsets of features, wherein the first plurality of digital files have one or more associated annotations. The first classification module is executable to form a plurality of classifiers for each of the subsets of features from the first plurality of digital files. The first classification module is also configured to extract one or more features from each of a second plurality of digital files and partition the features into a plurality of subsets of features. The first classification module is further executable to sort the plurality of the subsets of the second features using corresponding ones of the plurality of classifiers and determine a distance between respective subsets of features from the first and second plurality of digital files. The second classification module is executable to associate to a particular one of the second plurality of digital files at least one annotation derived from one or more annotations of the associated first plurality of digital files, wherein the at least one annotation is determined by a match from a subset of matched files to the particular one or more of the classifiers according to the distances between respective subsets of features from the first and second plurality of digital files.

In some embodiments, the second classification module is further configured to receive one or more digital files provided by a user. The second classification module may be executable to apply the one or more received digital files to the plurality of classifiers and determine a weight value corresponding to each one of the classifiers.

In some embodiments, the second classification module is further executable to combine weight values corresponding to one or more of the classifiers and associate one or more annotations from respective matched file or subset of matched files to the received digital file based on the combined weight values.

In other embodiments, a system for automating digital file annotation is described. The system comprises one or more processors, memory, and software modules stored in the memory. The software modules are executable by the one or more processors, and include instructions for: extracting a plurality of first features from each of a plurality of first digital files, each of the first digital files having one or more associated annotations; partitioning for each of the first digital files the first features into a plurality of subsets of the first features; forming a plurality of classifiers for each of the subsets of the first features; extracting a plurality of second features from each of a plurality of digital files; partitioning for the second digital files the second features into a plurality of subsets of the second features; sorting the plurality of the subsets of the second features using corresponding ones of the classifiers and determining a distance between respective subsets of the second features and the first features for the corresponding ones of the classifiers; based on distances for all subsets of a particular one of the second digital file, determining which of the first digital files is a match from a subset of matched files to a particular one or more of the classifiers; and associating with the particular one of the second digital files one or more annotations derived from a digital file from a selected group of matched first digital files.

In some embodiments, a computer readable storage medium includes storing one or more programs for execution by one or more processors. The one or more programs comprise instructions for: generating a plurality of classifiers from a plurality of first features of a plurality of first digital files, each or the plurality of first digital files having one or more associated annotations; sorting a plurality of second features extracted from a plurality of second digital files according to the plurality of classifiers; determining a distance vector between the second features and respective first features for the corresponding ones of the classifiers and ranking the determined distances; selecting a subset of matched files based on the ranking, the subset of matched files corresponding to respective one or more associated annotations; and associating one or more annotations from the associated annotations of the subset of matched files to subsequently received digital files using the corresponding ones of the classifiers.

In other embodiments, a computer readable storage medium includes storing one or more programs for execution by one or more processors. The one or more programs comprise instructions for: extracting a plurality of first features from each of a plurality of first image files, each of the first image files have one or more associated annotations; partitioning for each of the first image files the first features into a plurality of subsets of the first features; forming a plurality of classifiers for each of the subsets of the first features; extract-ing a plurality of second features from each of a plurality of second image files; partitioning for the second image files the second features into a plurality of subsets of the second features; sorting the plurality of the subsets of the second features using corresponding ones of the classifiers and determining a distance between respective subsets of the second features and the first features for the corresponding ones of the classifiers; based on distances for all subsets of a particular one of the second image file, determining which of the first image files is a match from a subset of matched files to a particular one or more of the classifiers; and associating with the particular one of the second image files one or more annotations derived from an image file from a selected group of matched first image files.

A high performance scalable media classification scheme, in accordance with the disclosed embodiments, annotates large-scale media files with significant computational savings and improved efficiency. The disclosed embodiments also include systems and methods for adapting annotated collections, trained against a large collection of publicly available media files, for customization of an automated means for annotating digital files.

These and other features and advantages of this description will become more readily apparent from the following Detailed Description, which proceeds with reference to the drawings, in which:

BRIEF DESCRIPTION OF THE DRAWINGS

FIGS. 6A-6D are diagrams illustrating various phases of executing a media file classification system according to some embodiments.

DETAILED DESCRIPTION

Certain details are set forth below to provide a sufficient understanding of embodiments of the invention. However, it will be clear to one skilled in the art that various embodiments may be practiced without these particular details. Moreover, the particular embodiments of the present invention described herein are provided by way of example and should not be used to limit the scope of the invention to these particular embodiments. In other instances, well-known system features, devices and software operations have not been shown in detail in order to avoid unnecessarily obscuring the invention. The subject is now described in more detail.

Figure 1A:
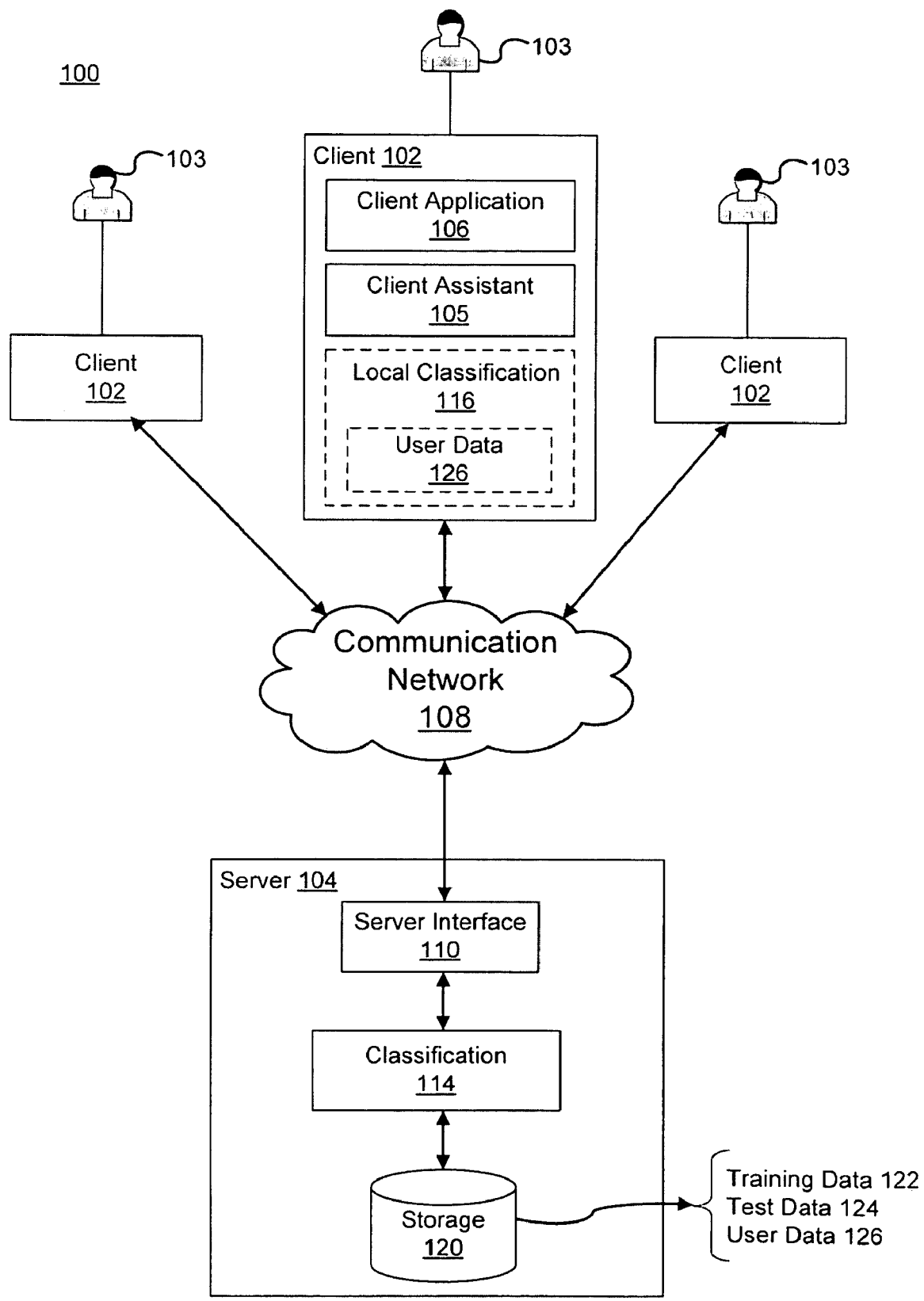
FIGS. 1A-1C are block diagrams of a distributed computer system including media classification according to some embodiments.

FIG. 1A is a block diagram of a distributed system 100 including media classification modules 114, 116 according to some embodiments. The network environment 100 includes one or more clients 102, and a server 104 interconnected by one or more communication network(s) 108.

The client 102 (sometimes called the "client device" or "client computer") may be any computer or similar device through which a user 103 of the client 102 can submit requests to and receive results or services from the server 104. Examples include, without limitation, desktop computers, notebook computers, tablet computers, mobile devices such as mobile phones, personal digital assistants, set-top boxes, or any combination of the above. A respective client 102 may contain at least one client application 106 for submitting application execution requests to the server 104, as well as a client assistant 105. For example, the client application 106 can be a web browser or other type of application that permits the user 103 to search for, browse, and/or use resources (e.g., webpages and web services) accessed from the server 104 via the communication network 108.

The client assistant 105 can be a software application that performs one or more tasks related to monitoring or assisting the user's 103 activities with respect to the client application 106 and/or other applications. For example, the client assistant 105 may assist the user 103 at the client 102 with browsing for resources (e.g., files) hosted by a website on a browser at the client 102; processes information (e.g., search results) received from the server 104; and monitors the user's 103 activities at the client 102. In some embodiments the client assistant 105 is embedded in one or more webpages (e.g., a search results web page) or other documents downloaded from one or more servers, such as the server 104. In some embodiments, the client assistant 105 is a part of the client application 106.

In some embodiments, the client 102 also includes the local classification component 116 that, in conjunction with the classification component 114 at the server 104, are components of a media file classification system, according to embodiments. In some embodiments, as will be further described, the classification components 104, 116 are software applications for indexing, annotating and retrieving digital media files from large-scale media collections stored at the client 102 or at the server 104. Optionally, the local classification component 116 may be part of the client 102, or the local classification component 116 may be implemented as part of the classification component 114 at the server 104. In other embodiments, the local classification component 116 and the classification component 114 can be implemented at separate servers or multiple servers.

The communication network 108 can be any wired or wireless local area network (LAN) and/or wide area network (WAN), such as an intranet, an extranet, the Internet, or a combination of such networks. In some embodiments, the communication network 108 uses the HyperText Transport Protocol (HTTP) to transport information using the Transmission Control Protocol/Internet Protocol (TCP/IP). The HTTP permits client computers to access various resources available via the communication network 108. The various embodiments, however, are not limited to the use of any particular protocol. The term "resource" as used throughout this specification refers to any piece of information and/or service that is accessible via a content location identifier (e.g., a URL) and can be, for example, a webpage, a document, a database, an image, a computational object, a search engine, or other online information service.

In some embodiments, the server 104 distributes content (e.g., web pages, images, digital photos, documents, files, advertisements, other forms of information). The server 104 may include many files or other data structures of various types, and those files or data structures can include any combination of text, graphics, video, audio, digital photos, and other digital media files. In some embodiments, the server 104 includes a server interface 110, the classification component 114, and data storage 120. The server interface 110 is configured to handle requests from clients 102 via the communication network 108. The classification component 114 is a machine learning application that utilizes a large collection of existing media files, such as digital photo images stored by Flickr, YouTube and/or other digital image repositories, to generate a user tool that automates the annotation, organization or classification of digital images with enhanced scalability.

In some embodiments, the data storage 120 stores a large collection of digital media files that is accessed when executing the local classification component 116 and/or the classification component 114. The data storage 120 may store data files that include training data 122, testing data 124 or user stored data 126. The training data 122 is a large-scale data set of digital image files having a large library of associated annotations that can be publicly accessed via the internet. The training data 122 is used to train the classification component 114 for annotating user digital image files according to embodiments. The testing data 124 is a second collection of digital image files which may be a portion of the larger collection used for training or a separate collection altogether. The testing data 124 is used by the classification component 114 and/or the local classification component 116 to test the system after it has been trained, according to embodiments. Once trained and tested, the classification component 114 and the local classification component 116 are used to annotate user data files 126 that may be stored at the server 104. In other embodiments, the user data 126 may be stored locally at the client 102 or as part of the local classification component 116.

Figure 1B:
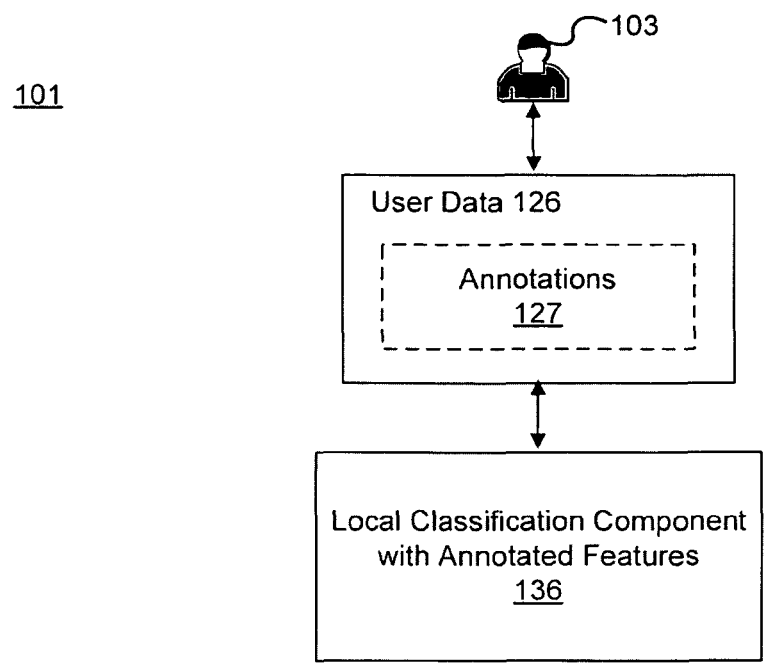

FIG. 1B is a block diagram of another distributed system 101 according to some embodiments. The user 103 accesses a local classification component 136 that is already configured with annotated features. The local classification component 136 is configured to receive user data 126. The user data 126 may optionally include user specified annotations 146 to customize the local classification component 136. In some embodiments, the local classification component 136 and/or the user data 126 are part of a client computer, and in other embodiments they are accessed from an external source such as a server, an external database or from a host in a networked environment.

Figure 1C:
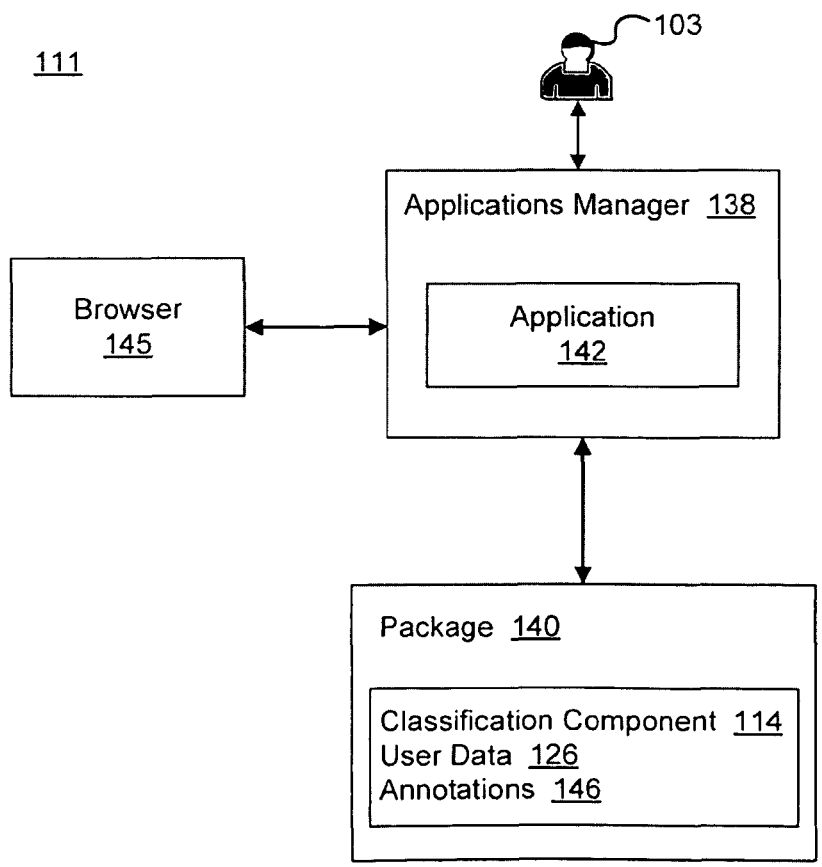

FIG. 1C is a block diagram of another distributed system 111 according to some embodiments. The system 111 includes an applications manager 138 having an application component 142 to execute programs such as a browser 145. The browser 145 may be used to view content at a web host such as Flickr, Picasa, FaceBook or other digital content management sites. The system 111 also includes package 140, which can be accessed locally by the applications manager 138, or may be accessed by the browser 145 at a host in a networked environment. In some embodiments, the package 140 includes the classification component 114 for annotating user's 103 digital media files, such as digital photos. In some embodiments, the package 140 also includes user data 126 and annotations 146. The annotations 146 may include labels or tags associated with a training set of digital image files, and may also include user 103 specified annotations from the user's 103 personal image file collection.

Figure 2A:
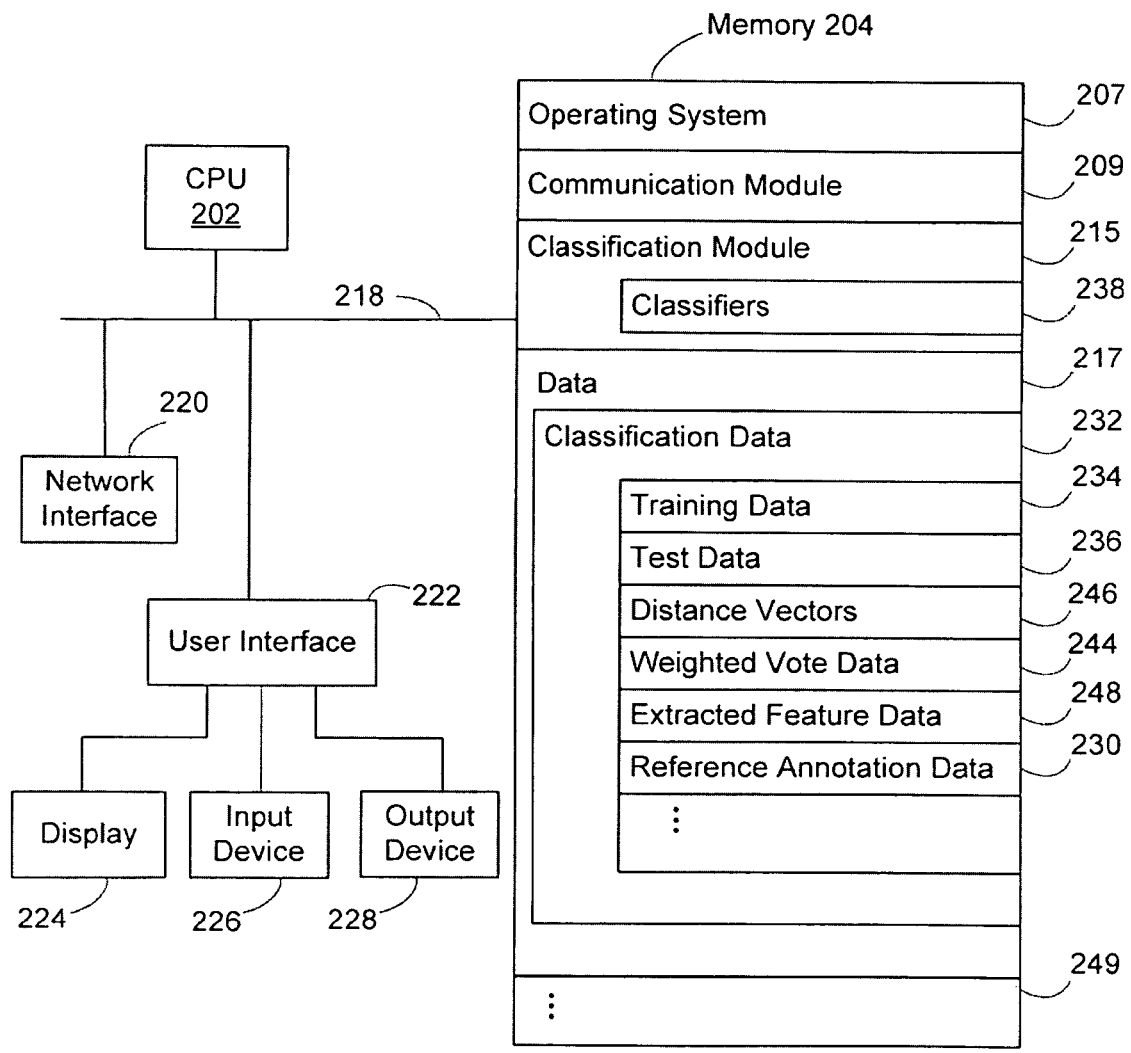
FIG. 2A is a block diagram of a client system according to some embodiments.

FIG. 2A is a block diagram of the server system 104 of FIG. 1 according to some embodiments. One or more components of the server system 104 may be accessed or executed from a single computer or from multiple computer devices; other generic components may be included but are not shown in the interest of brevity. The server system 104 generally includes one or more processing units (CPU's) 202, one or more network or other communications interfaces 220, memory 204, and one or more communication buses 218 for interconnecting these components. The communication buses 218 may include circuitry (sometimes called a chipset) that interconnects and controls communications between system components.

The server system 104 may optionally include a user interface 222 that includes, for instance, a display 224, input devices 226 and output devices 228. Input devices 226 can include, for example, a keyboard, a mouse, a touch-pad display screen, or any other appropriate device that allows information to be entered into the server system 104. Output devices 228 can include, for example, a video display unit, a printer, or any other appropriate device capable of providing output data. Note that input devices 226 and output devices 228 can alternatively be a single input/output device.

Memory 204 may include high speed random access memory and may also include non-volatile memory, such as one or more magnetic disk storage devices. Memory 204 may include mass storage that is remotely located from the central processing unit(s) 202. Memory 204, or alternately the non-volatile memory device(s) within memory 204, comprises a computer readable storage medium. Memory 204 stores the following elements, or a subset of these elements, and may also include additional elements:

- an operating system 207 that includes procedures for handling various basic server system services and for performing hardware dependent tasks;
- a communications module 209 that is used for connecting the server system 104 to other servers or computers via one or more communication networks (wired or wireless), such as the Internet, other wide area networks, local area networks, and metropolitan area networks and so on;
- a classification module 215 that includes components (e.g., classifiers 238) for training the media file classification system using large-scale collections of digital image files to automate the annotation of digital image files, according to some embodiments; and
- a data component 217 for storing classification data 232 to execute the classification module 215, which includes the following data:
  - training data 234, a large-scale collection of digital image data used to train the classification module 215 according to some embodiments;
  - test data 236, a second collection of digital image data or a portion of the larger collection designated to test the classification module 215 according to some embodiments;
  - distance vectors 246, the result of vector calculations made in a multidimensional feature space determined by classification variables, such as classifiers 238, for determining nearest neighbor candidates to a given data file, according to some embodiments;
  - weighted vote data 244, values generated by classification variables of the media file classification system to identify the closest matched candidate(s) according to some embodiments;
  - extracted feature data 248, dimensional features extracted from training data 234, test data 236 and other digital files used by various components of the media file classification system according to some embodiments; and
  - reference annotation data 230, which include annotations associated with training data 234, test data 236 and other digital files according to some embodiments.

Figure 2B:
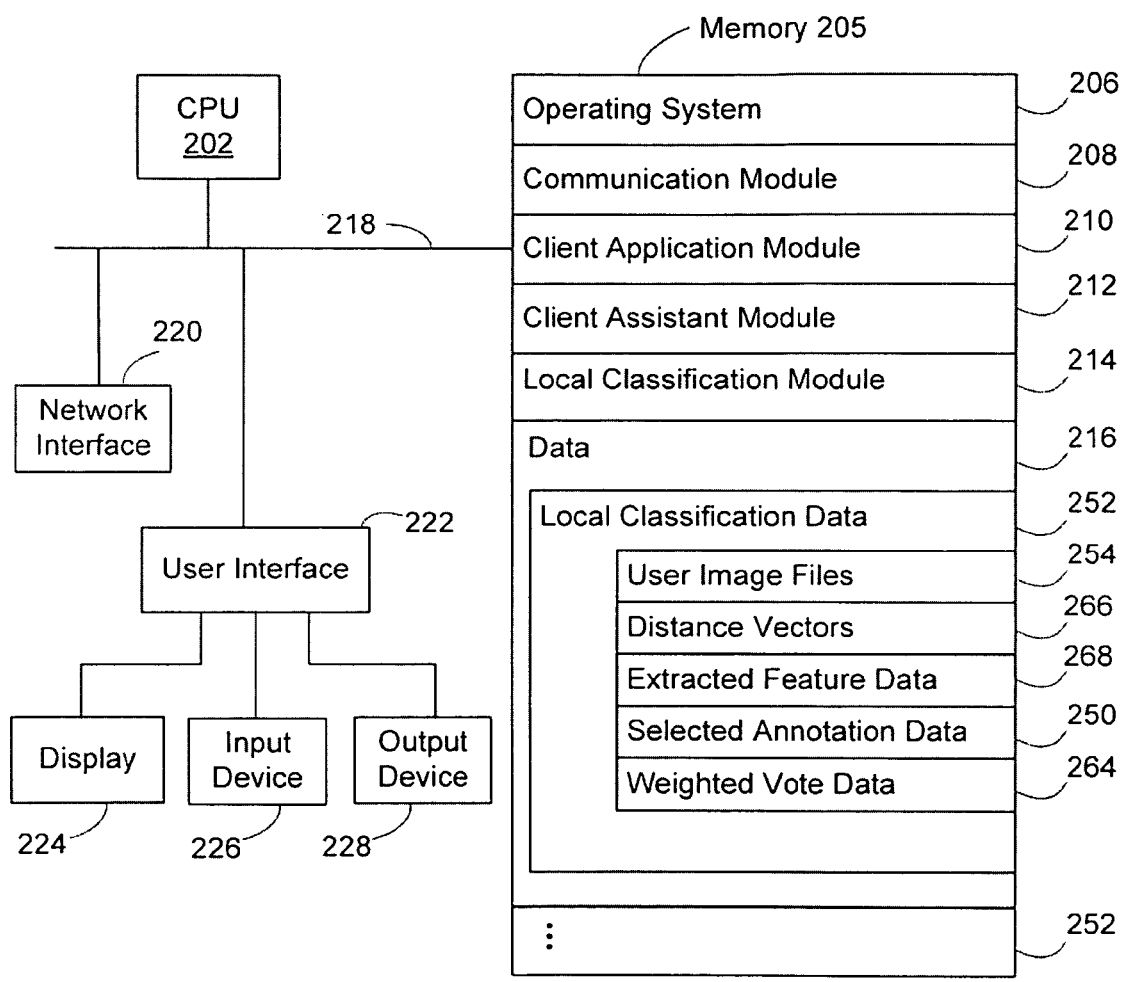
FIG. 2B is a block diagram of a server system according to some embodiments.

FIG. 2B is a block diagram of the client system 102 of FIG. 1 according to some embodiments. One or more components of the client system 102 may be accessed or executed from a single computer or from multiple computer devices; other generic components may be included but are not shown in the interest of brevity. FIG. 2B includes several components shown in FIG. 2A that share the same reference numbers as FIG. 2A. In the interest of brevity, these same features will not be described again.

The client system 102 also includes memory 205, which may include high speed random access memory and may also include non-volatile memory, such as one or more magnetic disk storage devices. Memory 205 may include mass storage that is remotely located from the central processing unit(s) 202. Memory 205, or alternately the non-volatile memory device(s) within memory 205, comprises a computer readable storage medium. Memory 205 stores the following elements, or a subset of these elements, and may also include additional elements:

- an operating system 206 that includes procedures for handling various basic system services and for performing hardware dependent tasks;
- a communications module 208 that is used for connecting the client system 102 to other client systems, servers or computers via one or more communication networks (wired or wireless), such as the Internet, other wide area networks, local area networks, and metropolitan area networks and so on;
- a client application module 208 (or instructions) for displaying content, such as web pages, to the user via user interface devices such as the display 224;
- a client assistant module 212, which may be add-on, plug-in, or any other module that provides additional functionality to the client 102.
- a local classification module 212 that includes configurations that allow the user's collection of digital image files to be automatically or semi-automatically annotated once the media file classification system is trained, according to some embodiments; and
- a data component 216 for storing local classification data 252, according to some embodiments, used by the local classification module 212 when executed, and includes the following data:
  - user image files 254, which include the user's personal collection of digital image files, such as digital photos from the user's digital camera or photos received from the user's friends and family, according to some embodiments;
  - distance vectors 266, which are vector calculations similar to the distance vectors 246, corresponding to user image files 254 according to some embodiments;
  - extracted feature data 268, which are dimensional features extracted from user image files 254 according to some embodiments.

selected annotation data 250, which include annotations assigned to user image files 254 according to some embodiments; and weighted vote data 264, which are values generated by classification variables associated with user image files 254 according to some embodiments.

Each of the above identified elements may be stored in one or more of the previously mentioned memory devices, and corresponds to a set of instructions for performing a function described according to various embodiments. The above identified modules or programs (i.e., sets of instructions) need not be implemented as separate software programs, procedures or modules, and thus various subsets of these modules may be combined or otherwise rearranged in various embodiments. For example, some of the modules and/or databases shown in FIGS. 1, 2A and 2B may be encompassed in another remote location (not shown) or in multiple locations. In some embodiments, memory 204 and 205 may store a subset of the modules and data structures identified above. Furthermore, memory 204 and 205 may store additional modules and data structures not described above.

FIGS. 1, 2A and 2B are intended more as functional descriptions of the various features rather than a structural schematic of the embodiments described herein. In practice, and as recognized by those of ordinary skill in the art, items shown separately could be combined and some items could be separated. For example, some items shown separately in FIG. 2A could be implemented on single servers and single items could be implemented by one or more servers. For example, the classification module 215 may be implemented on a different set of servers than the other components of server system 104. The actual number of servers used to implement system 104, and how features are allocated among them will vary from one implementation to another, and may depend in part on the amount of data traffic that the system must handle during peak usage periods as well as during average usage periods.

Figure 3:
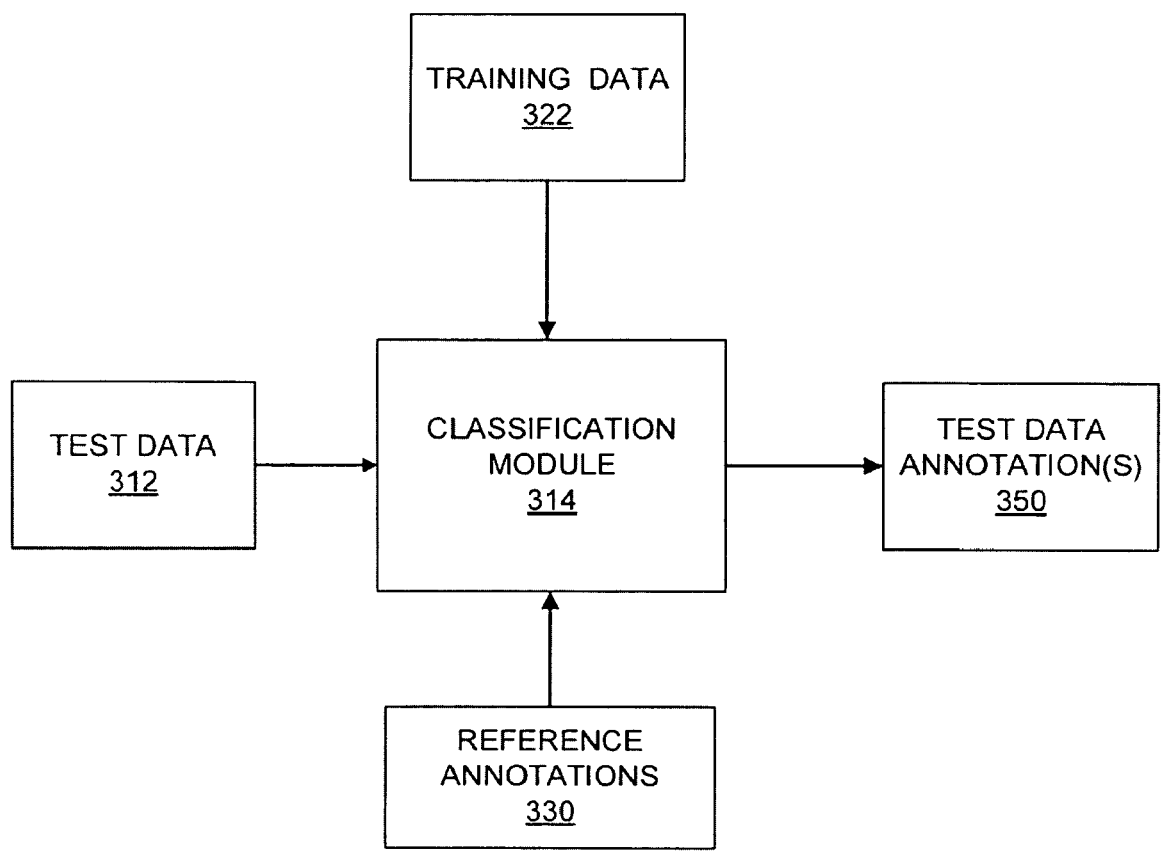
FIG. 3 is a block diagram of a media file classification system according to some embodiments.

FIG. 3 is a block diagram of a media file classification system 300 according to some embodiments. In some embodiments, the system 300 includes a classification module 314 configured to annotate digital image files using tags or labels from stored reference annotations 330. In other embodiments, the classification module 314 may include components for partitioning media files according to attributes or features. Media files include, but are not limited to, digital photos, resources from web pages (including text data from blog entries and instant messaging) and other data files categorized by tags or labels, such as audio or video files. Features include, but are not limited to, visual features (color, texture, edge detection, motion analysis, etc.) and audio features (audio digital data). In some embodiments the classification module 314 includes components for other categorization functions, such as clustering similar groupings of media files and/or features, indexing, parallel processing and other classification parameters to create, retrieve and update media files and features.

In some embodiments, the classification module 215 includes classifiers 238, which are machine learning algorithms for classifying objects, such as image files, compared to other objects in a collection. Examples of classifiers 238 include k-dimensional trees ("kd-trees") for calculating distance vectors of nearest neighbor objects using a classification algorithm. The reference annotations 330 may be manually associated with digital images in a large-scale collection of media files, such as digital image files, accumulated and stored online by a host, such as Flickr. The large-scale collection of media files, which includes training data 322, can be publicly obtained online. In some embodiments, a portion of the publicly accessed collection of digital image files are used as the training data 322 to train the classification module 314 for assigning tags or labels (annotations) to digital image files of a user. Alternatively, the training data 322 may be a personal collection of digital image files provided by the user. In some embodiments, the classification module 114 uses an approximate nearest neighbors search which, in accordance with the present invention, scales well to massive training sets of image files without sacrificing efficiency. In some embodiments, components for classifying an arbitrary number of categories are created in the classification module 314 using the training data 322. The module 114 then receives test data 312 to correlate the classifier components with the reference annotations 330 to generate test data annotations 350. The training and execution of the classification module 314 is described in further detail.

Figure 4:
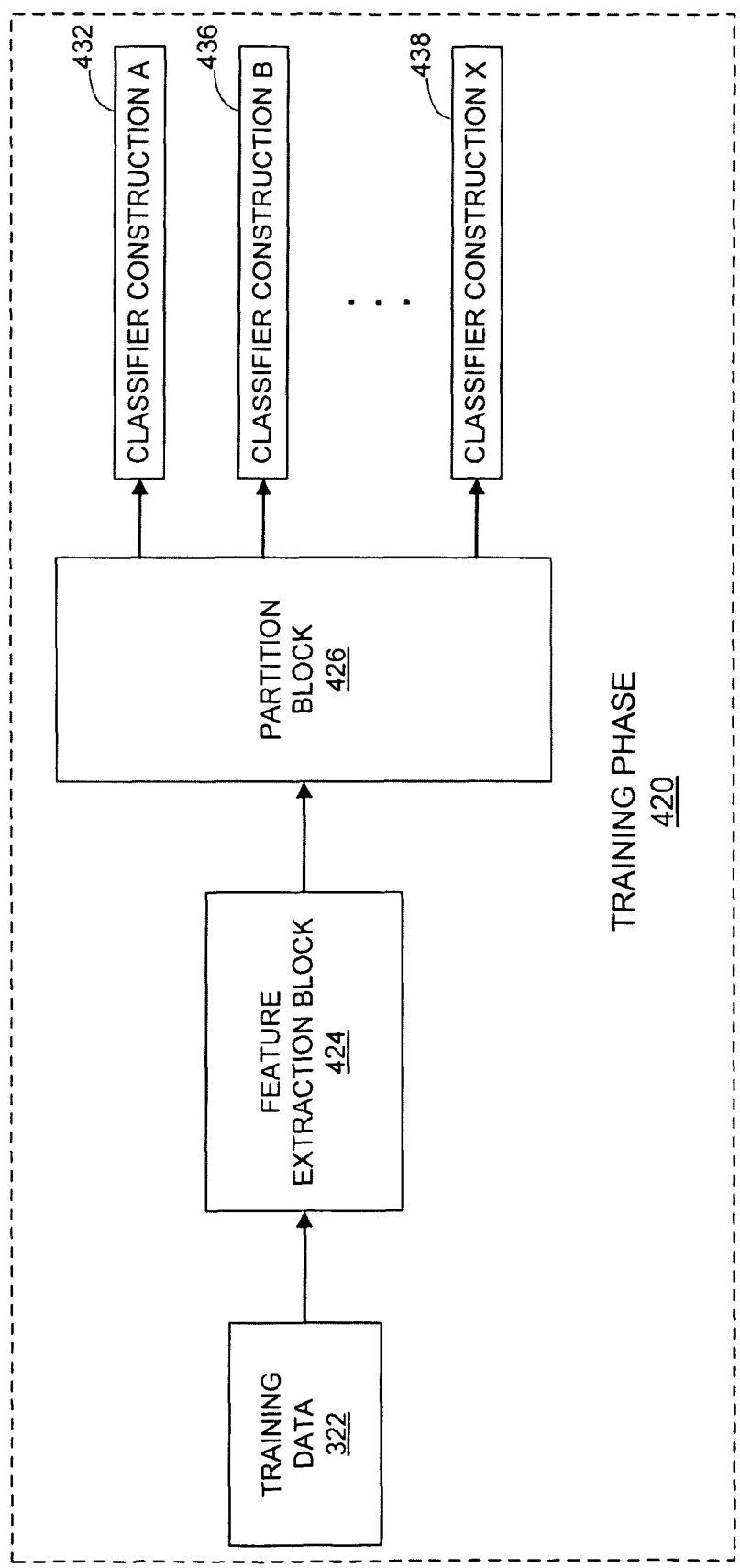
FIG. 4 is a block diagram of one component of the media file classification system according to some embodiments.

FIG. 4 is a block diagram illustrating the training phase 420 of the media file classification system 300 of FIG. 3 in more detail according to some embodiments. During the training phase 420 components for classifying digital image files are constructed using training data 322. The training phase 420 includes a feature extraction block 424 and a partition block 426 for constructing classifier components 432 to 438.

The feature extraction block 424 is configured to extract low-level feature data from each digital file using well-known feature analysis techniques. Feature data may include, but are not limited to, visual features such as color histograms, texture or edge features, motion analysis, face detection output and so on. In some embodiments, edge orientation histograms are extracted from each block of a uniform spatial grid, irrespective of image orientation, after obtaining filter responses, such as Canny filter responses. The edges may be quantized into a fixed number of equally split orientations bins to form a histogram. The magnitude of the edge of each pixel is counted as the weight for the bin within the corresponding orientation range. An extra bin is used for edge magnitudes below a threshold, or equivalently, to collect the smooth points (for blocks without significant detectable edges). Thus, each block has a resulting dimensional representation based on the number of orientation bins designated to form the respective histograms and the size of the spatial grid. The features are normalized in a per-dimension min-max style, according to the equation:

$$\hat{f}_i = \frac{f_i - f_i^m}{f_i^M - f_i^m} \quad (1)$$

For the $i^{th}$ dimension of $f_i^m$ (minimum feature value) and $f_i^M$ (maximum feature value) respectively, each feature value $f_i$ is normalized to $\hat{f}_i$.

Given the high dimensional feature space of each digital image, the features are partitioned into subsets of the features via the partition block 426 in order to characterize the massive training sets locally. Since low level-features are extracted by the feature extraction block 424, a series of simple search tree components can be constructed (the classifiers 432 to 438) by the partition block 426 using a nearest neighbor approach. A respective search tree is computed for each subset of features. In some embodiments, the simplest of classification technique relies on k-nearest neighbor components (kd-trees) as the classifiers 432 to 438. Since kd-trees cannot scale well when the dimensionality is high, a decomposition step is added to split the features into subspaces and reduce the dimensionality. In some embodiments, the features in the kd-trees are split into subspaces with no more than 30 dimensions. The constructed classifiers 432 to 438 (kd-trees) are used to accelerate approximate nearest neighbor searches from associated annotations of the training data 322.

Figure 5:
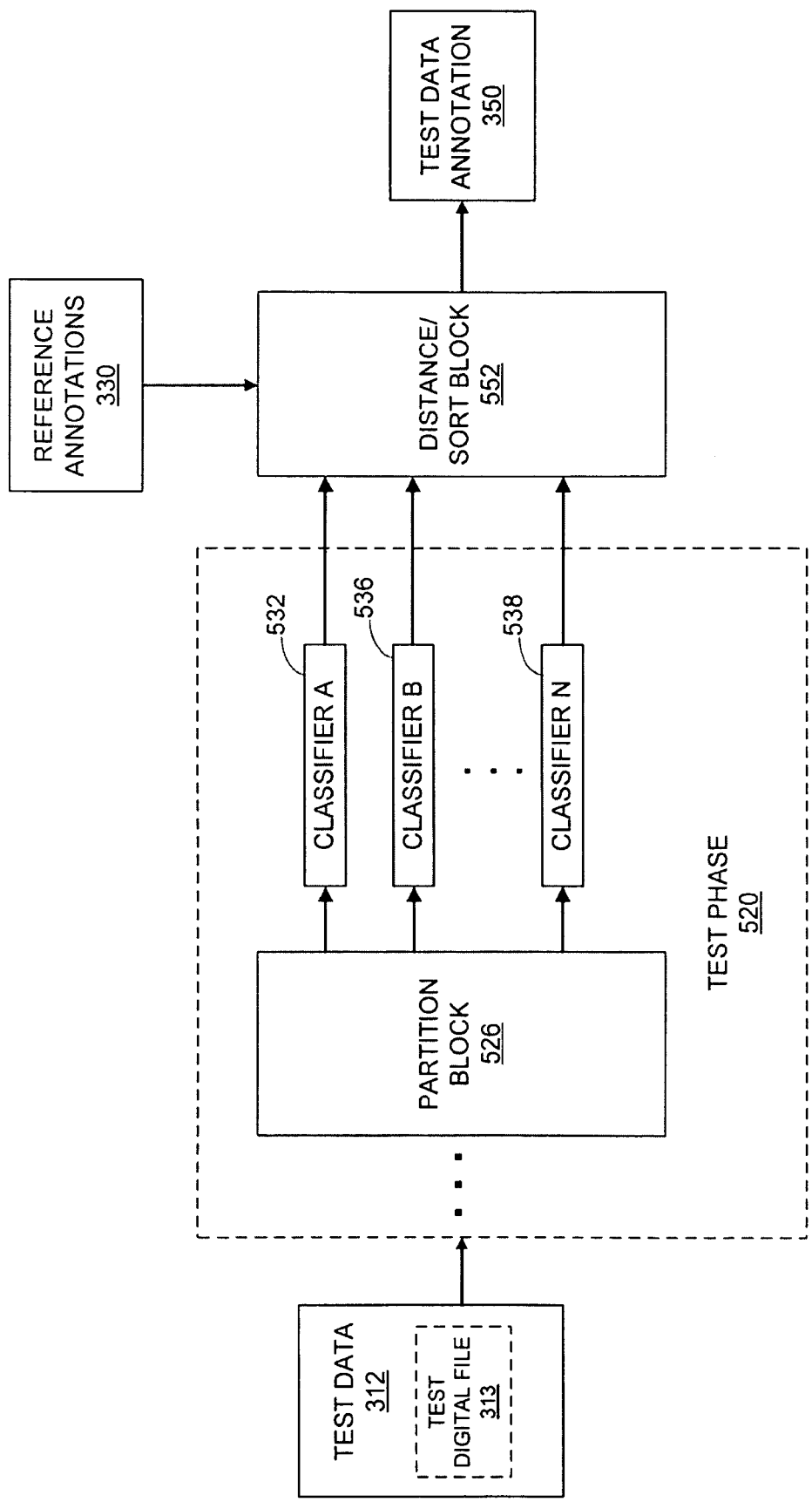
FIG. 5 is a block diagram of illustrating a training phase of the media file classification system according to some embodiments.

FIG. 5 is a block diagram illustrating a test phase 520 of the media file classification system 300 of FIG. 3 according to some embodiments. Once the classifiers 432 to 438 have been constructed using the training data 322, test data 312 is applied to the classifiers 432 to 438 to calculate nearest neighbor candidates from the training data 322 matched to each of the test digital files 313 of the test data 312. The test data 312 may be a portion of the publicly accessed collection of digital image files used as the training data 322 or, alternatively, the test data 312 may be a separate or personal collection of digital image files from the user. Each image file 313 from the test data 312 collection is received by the classification module 314 to extract features that are organized into feature subsets according to the classifiers 532 to 538 constructed during the training phase 420, as previously described. Approximate nearest neighbors are searched against the extracted features of the training data 322 to the extracted features of the test digital file 313 using the classifiers 532 to 538. Each tree 532 to 538 searches for nearest neighbor candidates (closely matched candidates from the training data 322) according to respectively assigned dimensional subspaces of the features extracted from each file 313. In some embodiments, each tree 532 to 538 searches for candidates within 30 or less dimensional subspaces in order to facilitate faster processing. Thus for each given image file 313, multiple nearest neighbor candidates are quickly identified from the training data 322 using partial distance calculations by the kd-trees 532 to 538. The partial distance calculations of the nearest neighbor candidates are combined by a distance/sort block 552 to recalculate full distances and determine the closest matched candidates to the image file 313. For illustration purposes, assume that ten nearest neighbors from each of the trees 532 to 538 are identified for the given test digital file 313 using the partial distance calculation procedure. This step produces on the order of hundreds of training samples, from which the ten closest to the image file 313 are determined by the distance/sort block 552 recalculating the full distances. The ten best candidates are considered for annotating the test digital file 313.

In some embodiments, a predetermined number of the closest matched nearest neighbor candidates are selected. In some embodiments, the nearest neighbor candidates for each search can be truncated by known priority queue techniques to identify the best matched samples or a subset of matched samples from the training data 322. Alternatively, a threshold criteria may be used to determine the best matched samples from the pool of candidates determined by partial distance calculations and/or from the pool of candidates determined by full distance calculations. In some embodiments, once the closest matched candidates are identified, the distance/sort block 552 is configured to subsequently vote on the image file 313 using a distance-weighted score calculated for each of the best matched candidates or a subset of matched candidates to identify the test data annotation(s) 350, as will be further described in detail.

FIGS. 6A-6D illustrate data structures for the training and testing phases 420, 520 of the media file classification system 300 of FIG. 3 according to some embodiments. In some embodiments (as previously described with respect to FIG. 4), in order to extract the features of each image file 313 the feature space of each digital image is defined by a predetermined spatial grid, wherein each block of the grid is filtered using known edge detection methods to designate orientation bins and form histograms. For example, in FIG. 6B, according to some embodiments, a spatial grid 652 is defined by a 7×7 dimension, and the edges are quantized into 16 equally split orientation bins 654. One additional bin 656 is used for edge magnitudes below a certain threshold such that each block has 17 dimensional representations. Thus, the resulting dimensionality for features corresponding to each image file 313 is 49×17=833. Given the enormous number of digital image files that are available online, a larger set of training samples can be utilized. Other known classification techniques that utilize large dimensional training sets rely on techniques that involve computational complexity, and are time consuming and inefficient. Thus, the high dimensionality of the training set must be resolved, and constraints due to computational complexity and processing time due to size must be overcome in order for the classification scheme to be useful.

Figure 6A:
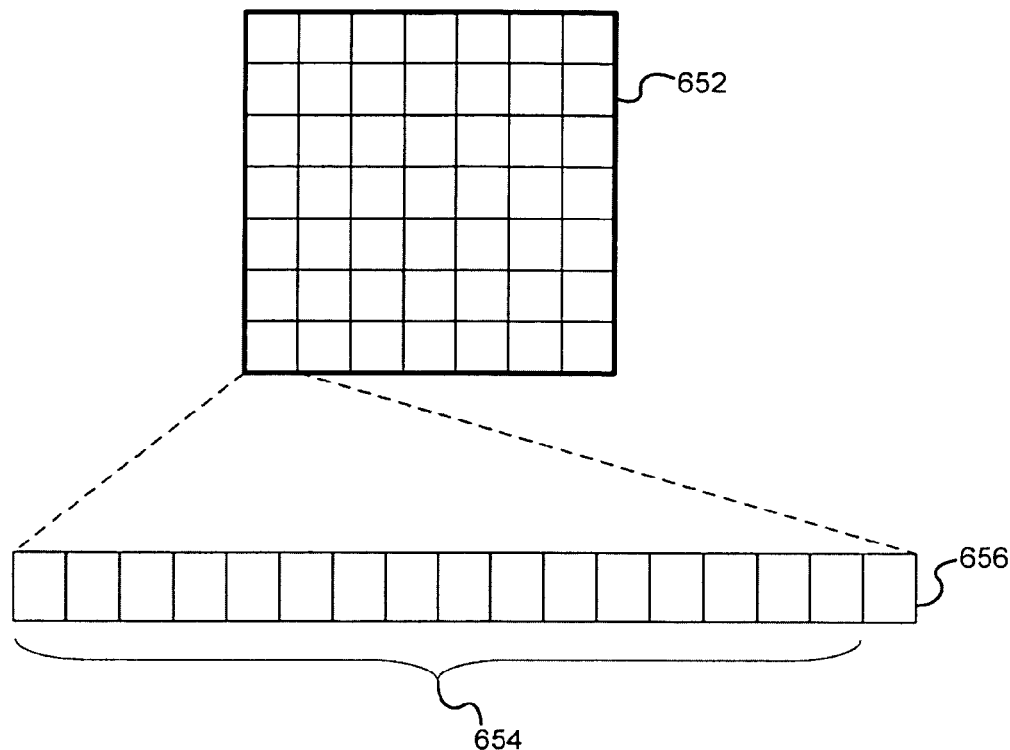
Figure 6B:
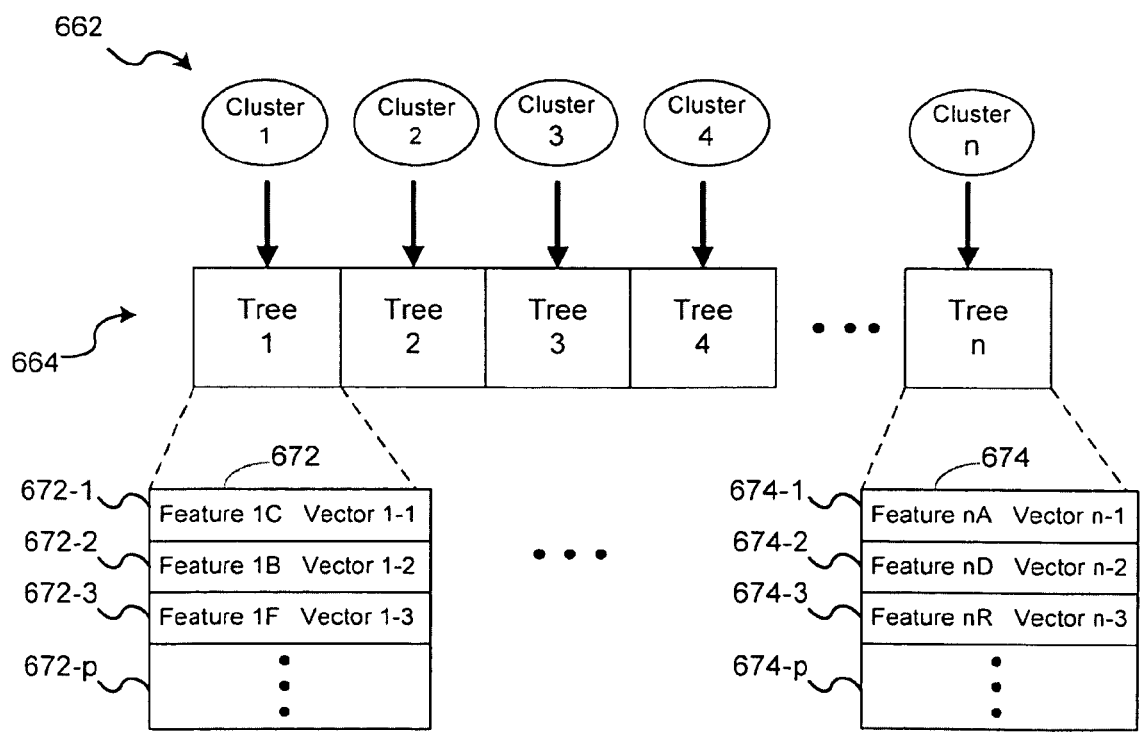

In accordance with the above mentioned example, FIG. 6B, in some embodiments, illustrates how the features of an image (e.g., 833 total features) can be subdivided into subsets of features, such as clusters 662 (1 to n). The subsets of features may be subdivided for ease of constructing and executing the low-dimensional classifiers 532 to 538. In some embodiments, the subsets of features may be subdivided according to orientation bins 654, 656. In other embodiments, the subsets of features may be organized according to a category of features, for example, a feature associated with each orientation bin 654, 656. The clusters 662 are each used to construct corresponding classifier trees 664 during the training phase 420. In the testing phase 530, features are extracted for each test digital file 313 and partitioned in a manner consistent with the construction of the classifier trees 664 for comparing features and calculating distance vectors to identify nearest neighbor candidates. Thus, for each tree 664, the corresponding set of features 672 include features 672-1 to 672-*p* that are used to calculate partial distances and identify potential nearest neighbor candidates. For example, for each feature 672-1 to 672-*p*, a partial distance is calculated as vectors 1-1 to 1-p, compared against respective features extracted from candidates of the training data 322. Thus, in this particular example, for the nth tree 664, features 674 are identified as corresponding to its own set of features 672. In some embodiments, partial distance vectors n-1 to n-p are calculated and the features are ranked according to the partial distance calculations. Subsequently, all the features for a respective candidate neighbor file are combined at the distance/sort block 552 to calculate the total distance for each candidate neighbor. The candidate neighbors may also be ranked to identify the best matched candidates or a subset of matched candidates, as will be described further.

Therefore, the nearest neighbor search using the classifier trees 664 generates partial distance calculations for an initial ranking of the features for each respective tree 664. The potential best candidates or subset of candidates are selected from the initial pool in a number of different ways, as previously described. The partial distance calculations for respective candidates can be further refined by combining the partial distance calculations across all the classifier trees 664 to determine full distances (in the distance/sort block 552) to determine the final candidates. The candidates can be ranked according to the final full-distance vector results and a predetermined number of the top candidates are selected for annotating the test digital file 313. The classifier trees 664 may be constructed a number of different ways, including according to categories of tags, topics, themes, and so forth.

For example, in other embodiments, each tree 664 may be constructed according to a plurality of features associated with a particular tag or a group of tags sharing a common theme.

In some embodiments, a distance-weighted score is calculated for each label (tag) corresponding to the class of the closest matched candidates. For purposes of illustration, assume that the predetermined number of the closest matches to the test sample is ten. The ten training samples are denoted as $x_i$, where $i=\{1, \ldots, 10\}$ and the test sample (query image) is q. Assume for simplicity that the ten samples are sorted according to their distance from q such that $x_1$ is the training sample closest to q and the distance from the $i^{th}$ furthest of the ten samples is $d(x_i,q)$. Then the score for each label (tag) l can be determined according to the equation:

$$f(l) = \sum_{i=1}^{9} \left( \frac{d(x_{10,q}) - d(x_{i,q})}{d(x_{10,q}) - d(x_{1,q})} \right) \delta(Y_i(l) - 1) \qquad (2)$$

where $\delta(\bullet)$ is the delta function which is one when its argument is zero and otherwise zero. Where $Y_i(l)=1$ indicates whether the label l has been applied to the training sample $x_i$, and $Y_i(l)=-1$ indicates otherwise. The best matched weighted vote score(s) indicate the best matched test data annotation 350.

FIG. 6C illustrates a data structure of ranked candidates 673 after the final distance-weighted scores have been calculated. In some embodiments, for each candidate 673-1 to 673-n in the set, a corresponding distance-weighted score is calculated by combining the partial distance calculations across all trees. Thus, the candidates 673 are ranked according to their respective distance-weighted scores, and a predetermined number of candidates 673 can be identified as the best matched or a subset of matched candidates. In some embodiments, each candidate 673-1 to 673-n corresponds to a respective file from the training data 322. In other embodiments, the class of candidates 673 may represent a single tag or a category of tags.

FIG. 6D represents a data structure 680 that identifies the closest matched candidates 683-1 to 683-n according to other embodiments. Once the closest matched candidates 683 are identified, the candidates 683 may be utilized in a number of ways for annotating test data 312. In some embodiments, a tag or set of tags may be predetermined, and the user may be interested in determining how well a particular tag is matched to the test digital file 313 of the test data 312. Alternatively, the user may be interested in identifying the best matched or a subset of matched files to a class of tags or a tag from a class of tags. Given a tag (or a set of tags) and the test digital file 313 in some embodiments, each of the best matched candidates 683-1 to 683-n are used to vote on the tag or class of tags using the distance-weighted scores. In some embodiments, each candidate 683-1 to 683-n votes according to whether its respective distance-weighted score meets a threshold value, and casts a binary vote 682-1 to 682-n of a "1" or a "0." The resulting votes may be combined to determine the degree to which a particular tag or class of tags can be associated with the test digital file 313. For example, given the test digital file 313 and a first tag, if six of ten best matched candidates 683 results in a "1" vote, then the strength of the first tag is 0.6. If nine often best matched candidates 683 results in a "1" vote for a second tag, then the strength of the second tag is 0.9. Consequently, the second tag is a better match for the given test digital file 313.

Figure 7:
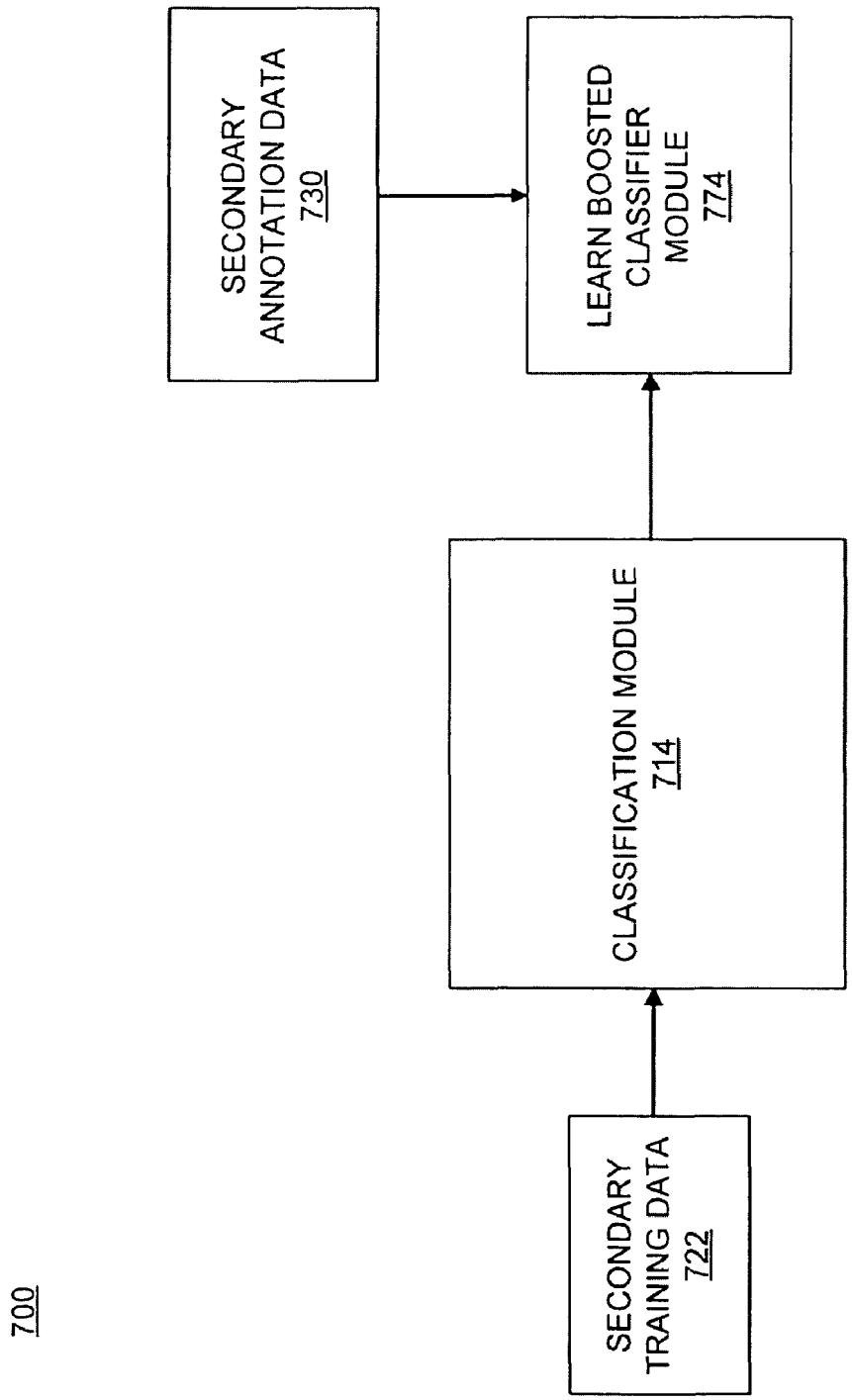
FIG. 7 is a block diagram of a media file classification system including a learned classification module according to some embodiments.

FIG. 7 is a block diagram of a boosted classification system 700 that includes a boosted classification module 774 according to some embodiments. In some embodiments, the boosted classification system 700 includes the boosted classifier module 774 incorporated into the classification system 300 of FIG. 3 and is used to further refine the process for annotating data files. In some embodiments, related features are selected and the candidate results of the related features are combined using boosted classification, an adaptive machine learning technique that iteratively constructs a stronger classifier resulting from a combined set of "weak" classifiers (a low-feature or simple classifier). The classification module 714 is executed in the same manner as the classification module 314 of FIG. 3, except that training data, indicated as secondary training data 722, is used to further train the classifiers 532 to 538. In a similar process described for FIGS. 3-6, the classifiers 532 to 538 are used to calculate nearest neighbor candidates 673, 683. In the boosted system 700, each of the classifiers 532 to 538 are considered "weak" classifiers. The weak classifiers are further trained by recalculating distance vectors and distance-weighted scores against the secondary training data 722 and associated secondary annotation data 730. The new distance-weighted values for determining the nearest neighbor candidates 673, 683 are additively weighted and combined to form a stronger boosted classifier in the learn boosted classifier module 774. The boosted classifier is an improved classifier that more accurately annotates subsequently received test data files. In some embodiments, the secondary training data 722 may be a secondary set of data acquired from a publicly available source such as Flickr or YouTube on the internet. In some embodiments, the secondary training data 722 is one or more sets of content provided by the user. The content provided by the user may have user provided annotations already associated with each file. In some embodiments, multiple iterations of the secondary training data 722 are used to recalculate and further refine the learned weights. With each iteration, the combined weak classifiers 532 to 538 produce a better trained and/or customized boosted classifier that is more indicative of user preferences. In some embodiments, each iteration consists of user provided preferences, such as user-created tag annotations to the user's own collection of files, to allow customization of the boosted system 700. Thus, the boosted system 700 is a low cost means for building a reliable, customizable classification system having high dimensionality for annotating data files and other resources.

In some embodiments, the learn classification module 774 combines the weak classifiers 532 to 538 to form the boosted classifier according to the following equation:

$$F(x, l) = \sum_{t=1}^{T} \alpha_t(l) h_t(x, l) \qquad (3)$$

where, for T iterations of the boosting algorithm above, each weak classifier $h_t(x,l)$ is defined for sample file x (e.g., photo image file) and label l by a distribution which weighs training samples $\alpha_t$ with respect to each label l. The distribution is updated as:

$$D_t(x, l) = \frac{D_{t-1}(x, l) \exp(-\alpha_{t-1}(l) Y_x(l) h_{t-1}(x, l))}{Z_{t-1}(l)} \qquad (4)$$

where $Y_x(l)$ accounts for user supplied or manually tagged input for tag l and the sample file x. At each round t, a weak classifier $h_t$ is selected with a small error on the training samples as weighted by $D_t$. Thus, Dt is a distribution that weighs the samples used to train the boosted classifier of the module 774. As the algorithm progresses, it weighs misclassified samples increasingly, and thereby reduces error associated with $\alpha_t$ in Equation 3. The boosted classifier training mechanisms prescribed by Equations 3 and 4 iteratively decrease an upper bound on the Hamming loss (total per-label loss) of the final boosted classifier and reduce error.

In some embodiments, the boosted classifier can be learned, from a candidate set of weak learners $H_p=\{h_1(\bullet), h_2(\bullet), \ldots h_k(\bullet)\}$, to optimize the following collective cost function (averaged error on multiple tags of multiple files) at each iteration t=1, ..., T according to:

$$\{\alpha_t, h_t\}_{t=1}^T = \text{ArgMin}_{\alpha,h} \sum_{i,l} \log(1 + \exp(-Y_i(l)F_l(x_i) + \alpha(l)h(x_i, l))) \quad (5)$$

The logistic cost function includes the total error across all labels Y(l), l=1, ..., L and samples $x_i$=1, ... N in the training data. Thus, for a series of iterations, a boosted classifier $h_t \epsilon H_p$ is selected without replacement, and the boosted classifier learns the optimal weighting for each label $\alpha_t(l)$.

In some embodiments, a weak classifier is selected having an optimized weighted factor, and the selected classifier is used across all classifiers to optimize the joint logistic loss of Equation 5. On the other hand, it is suboptimal in the sense of selecting weak classifiers that optimize the collective loss rather than the per-label loss. In other words, performance would improve it the same approach is utilized but minimize each per-label loss independently. In some embodiments, more weak classifiers could be used for the collective labeling task. However, this approach is likely to be tractable given that additional computation is not required to calculate the additional weak classifiers, merely additional storage. Furthermore, in some embodiments, the training of the boosted classifier can occur off-line. The weights and classifiers are pre-calculated, such that test time is not substantially increased. The computation of $H_p$ does not depend critically on the number of labels. Rather the size of training set and the dimensionality of the feature representation determine computational complexity.

In summary, a label (tag) may be annotated using other labels and large data sets using the learned classification module 774 and secondary training data 722 to reduce errors without compromising efficiency. Furthermore, the nearest neighbor approach requires training a single set of trees shared for all candidates allowing the systems 300, 700 to manage large quantities of media files with high dimensionality and without rely on computational complexity.

Figure 8:
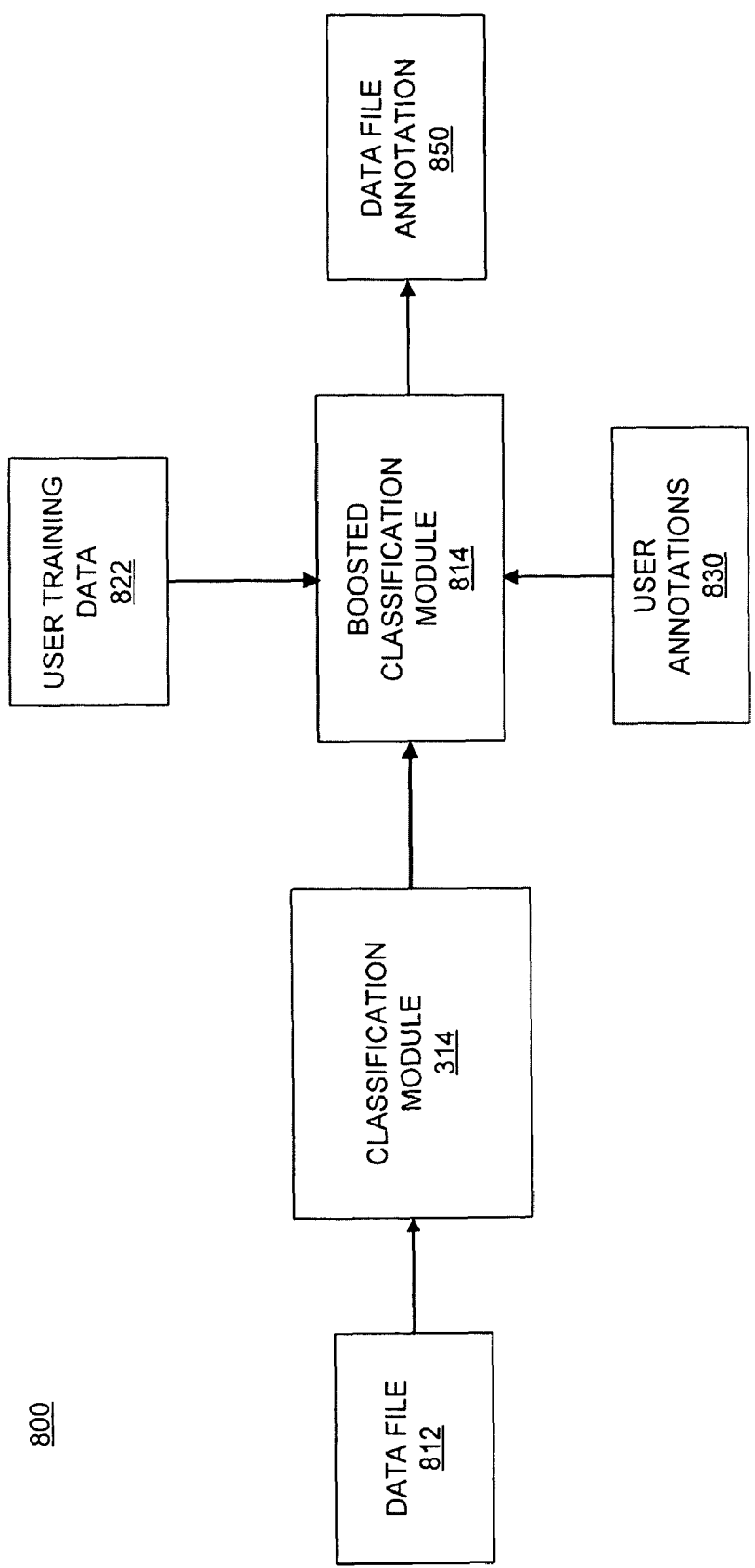
FIG. 8 is a block diagram of a media file classification system including a boosted classification module according to some embodiments.

FIG. 8 is a block diagram of a media file classification system 800 that includes a boosted classification module 814 trained according to the process described with respect to FIG. 7, according to some embodiments. As previously described, the boosted classification module 814 provides additional means to iteratively apply weights to weak classifiers (classifiers 532 to 538) implemented by the classification module 314. According to some embodiments, once the system 800 has been trained, tested and refined, a user may apply the user's own annotated collection of digital image files, user training data 822, to boosted classification module 814 and update the classifier 532 to 538 by learning weights with respect to the user's personal collection for boosted classifiers that predict the user's annotation data 830. The boosted classification system 800 may be used to annotate subsequently received data files 812 provided by the user to generate subsequent data file annotations 850. In some embodiments, data files 812 may be files from, but not limited to, a digital camera, a cell phone, personal computer, laptop, PDA, or other hand held devices. As with test data 312, data files 812 may also be from the user's own collection of data and/or data acquired from public web sites or from other users via the internet.

In some embodiments and for illustration purposes, experimental results from trained media classification systems 300, 800 using a large-scale data set assembled from the photo sharing site Flickr are compared to other known automated annotation methods. Digital image photos in the order of 56,315 photos are selected for possessing at least one among a popular set of tags. The photos are randomly split into approximately equal training and test sets, 28,157 for training and 28,158 for testing. Of at least 450 of the downloaded photos, 34 popular labels (tags) are selected for testing (the photo set includes more than 5000 tags). For these labels, nearest neighbor determinations are made using the system 300 and the system 800; the results from each of the systems 300, 800 are also compared to results using standard support vector machines (SVMs), which is a common and competitive baseline approach. For training the boosted weights, 3,128 photos from the test set are used so that there is a small discrepancy between the test sets in the experimentation (the total test set size being 28,158).

The results of the experiment appear in Table 1 below, and demonstrate that the nearest neighbor approach and the boosting approach using systems 300, 800, respectively, perform at essentially the same or improved mean average precision (MAP) as the SVM approaches.

TABLE 1

|  | Per-tag SVM | | | | NN | NN + MSBOOST |
| --- | --- | --- | --- | --- | --- | --- |
|  | eh17 5x5 | | eh17 7x7 | | eh17 7x7 | eh17 7x7 |
|  | mean | median | mean | median | — |  |
| summer | 0.039 | 0.039 | 0.053 | 0.055 | 0.047 | 0.046 |
| family | 0.020 | 0.020 | 0.021 | 0.021 | 0.060 | 0.074 |
| mountains | 0.248 | 0.245 | 0.270 | 0.265 | 0.103 | 0.102 |
| spring | 0.026 | 0.025 | 0.025 | 0.025 | 0.060 | 0.073 |
| vacation | 0.028 | 0.028 | 0.027 | 0.027 | 0.046 | 0.048 |
| sea | 0.186 | 0.184 | 0.183 | 0.183 | 0.138 | 0.133 |
| church | 0.023 | 0.023 | 0.023 | 0.023 | 0.122 | 0.159 |
| cat | 0.133 | 0.153 | 0.024 | 0.023 | 0.070 | 0.052 |
| city | 0.142 | 0.161 | 0.176 | 0.170 | 0.092 | 0.153 |
| flower | 0.032 | 0.031 | 0.031 | 0.032 | 0.334 | 0.395 |
| winter | 0.029 | 0.029 | 0.031 | 0.030 | 0.071 | 0.053 |
| camping | 0.092 | 0.102 | 0.102 | 0.112 | 0.073 | 0.075 |
| festival | 0.025 | 0.023 | 0.022 | 0.022 | 0.055 | 0.071 |
| sky | 0.273 | 0.344 | 0.192 | 0.343 | 0.224 | 0.274 |
| snow | 0.032 | 0.031 | 0.029 | 0.029 | 0.071 | 0.063 |
| party | 0.026 | 0.021 | 0.139 | 0.152 | 0.064 | 0.107 |
| beach | 0.044 | 0.044 | 0.239 | 0.239 | 0.224 | 0.242 |
| christmas | 0.124 | 0.121 | 0.120 | 0.115 | 0.024 | 0.052 |
| urban | 0.205 | 0.267 | 0.159 | 0.266 | 0.162 | 0.218 |
| garden | 0.155 | 0.187 | 0.029 | 0.026 | 0.126 | 0.105 |
| nature | 0.022 | 0.022 | 0.021 | 0.021 | 0.082 | 0.160 |
| water | 0.023 | 0.023 | 0.023 | 0.023 | 0.106 | 0.082 |
| birthday | 0.041 | 0.041 | 0.168 | 0.207 | 0.149 | 0.194 |
| california | 0.069 | 0.066 | 0.069 | 0.066 | 0.032 | 0.033 |
| wedding | 0.024 | 0.024 | 0.025 | 0.024 | 0.206 | 0.200 |
| baby | 0.227 | 0.268 | 0.317 | 0.333 | 0.244 | 0.337 |
| animals | 0.093 | 0.095 | 0.098 | 0.100 | 0.057 | 0.054 |
| flowers | 0.010 | 0.009 | 0.009 | 0.009 | 0.034 | 0.075 |
| clouds | 0.543 | 0.621 | 0.552 | 0.567 | 0.512 | 0.520 |
| ocean | 0.242 | 0.232 | 0.216 | 0.213 | 0.224 | 0.182 |

TABLE 1-continued

| | Per-tag SVM | | | | NN | NN + |
|---|---|---|---|---|---|---|
| | eh17 5x5 | | eh17 7x7 | | eh17 7x7 | MSBOOST |
| | mean | median | mean | median | — | eh17 7x7 |
| sunset | 0.232 | 0.250 | 0.233 | 0.261 | 0.245 | 0.235 |
| 2007 | 0.008 | 0.008 | 0.030 | 0.036 | 0.010 | 0.013 |
| mountain | 0.082 | 0.092 | 0.092 | 0.096 | 0.107 | 0.118 |
| river | 0.107 | 0.141 | 0.116 | 0.109 | 0.114 | 0.132 |
| MAP | 0.106 | 0.117 | 0.114 | 0.124 | 0.126 | 0.142 |

In particular, the use of boosting improves overall performance. For example, Table 1 shows the SVM approach results in an MAP between 0.114 to 0.124 (for eh17 7×7), and the nearest neighbor approach (the system 300) indicates a slight improvement of an MAP at 0.126. In comparison, the MAP result using both the nearest neighbor approach and boosting (the system 800) indicates a much higher precision performance of 0.142. Table 1 also demonstrates that other tags and large data sets can be utilized and is efficient for annotating a given label (or tag).

Figure 9:
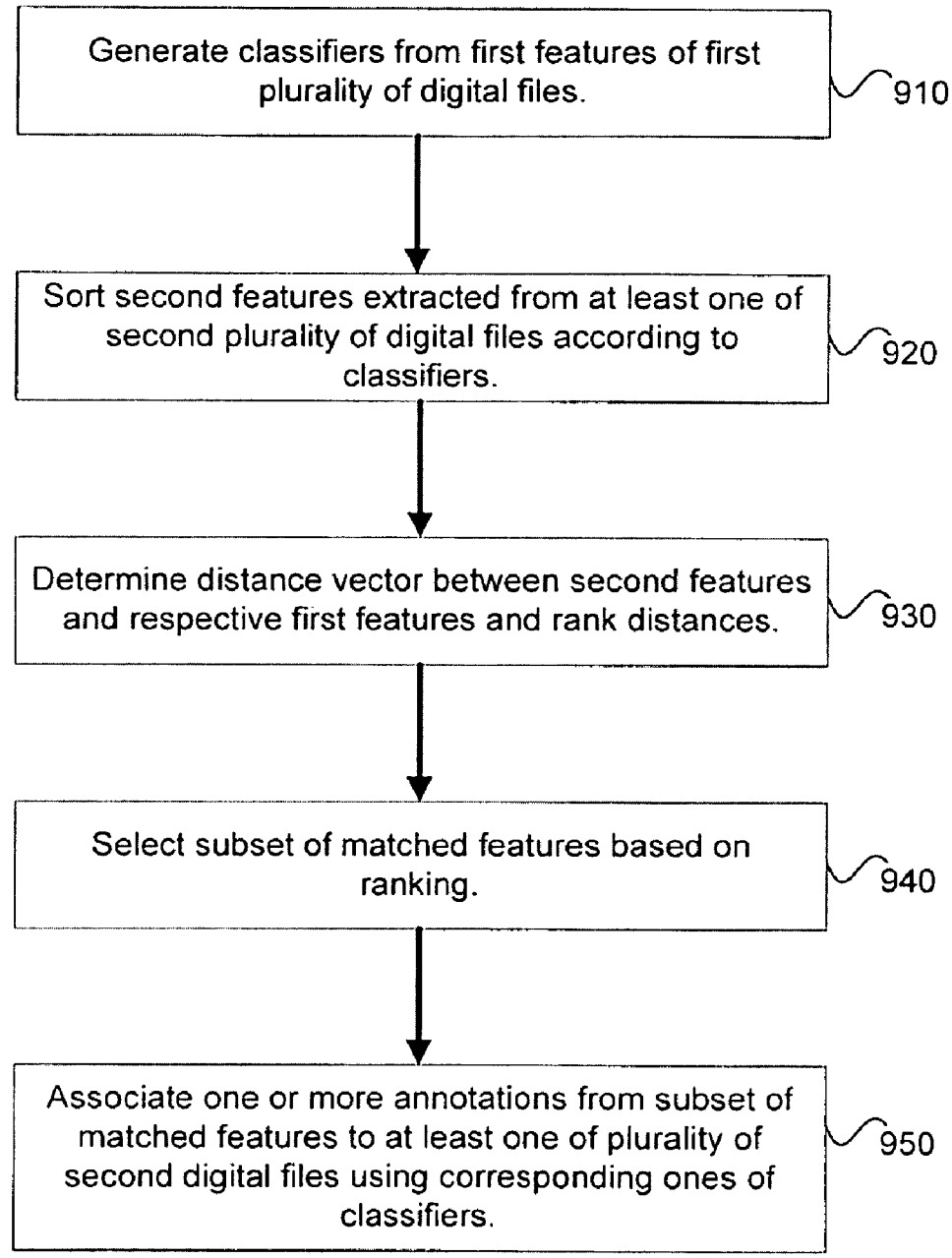
FIG. 9 is a flow diagram illustrating a method of a media file classification system according to some embodiments.

FIG. 9 is a flow diagram illustrating a method 900 for implementing media file classification systems 300, 800 according to some embodiments. The method 900 describes all implementation for automating image file classification/annotation of digital image files. In some embodiments, the method includes generating a set of classifiers from a plurality of first features of a first plurality of digital files, each of the plurality of first digital files having one or more associated annotations (910). At step 920, a plurality of second features extracted from at least one of a second plurality of digital files is sorted according to the set of classifiers at step 910. A distance vector between the second features and respective first features for the corresponding ones of the classifiers is determined and the features are ranked according to the determined distances (930). At step 940, a plurality of best matched files or a subset of matched files are selected based on the ranking, the plurality of best matched or the subset of matched files corresponding to respective one or more associated annotations, and at step 950 one or more annotations from the plurality of best matched or the subset of matched files is associated to the at least one of the second plurality of digital files using the corresponding ones of the classifiers.

Figure 10A:
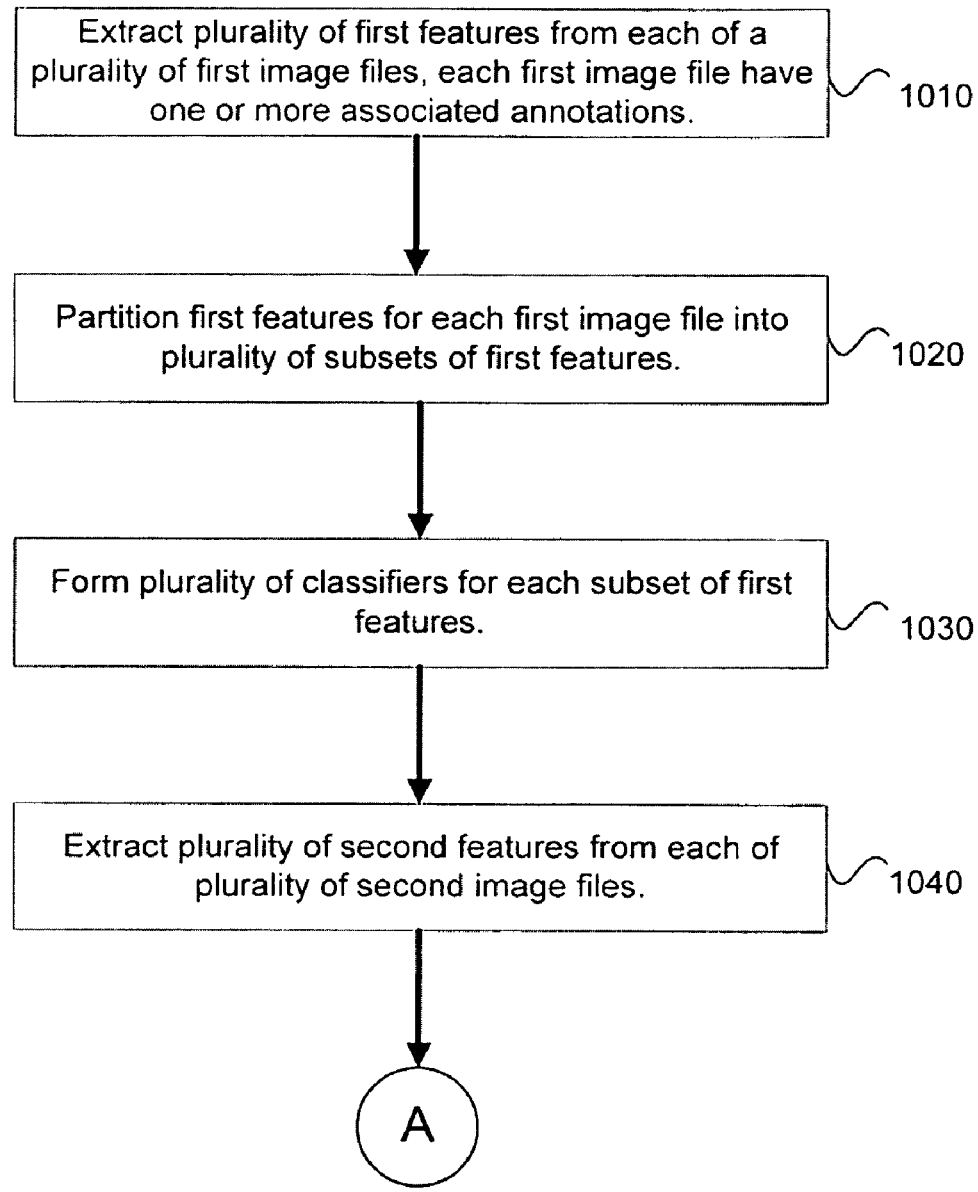
FIGS. 10A-10B is a flow diagram illustrating a method of a media file classification system according to other embodiments.
Figure 10B:
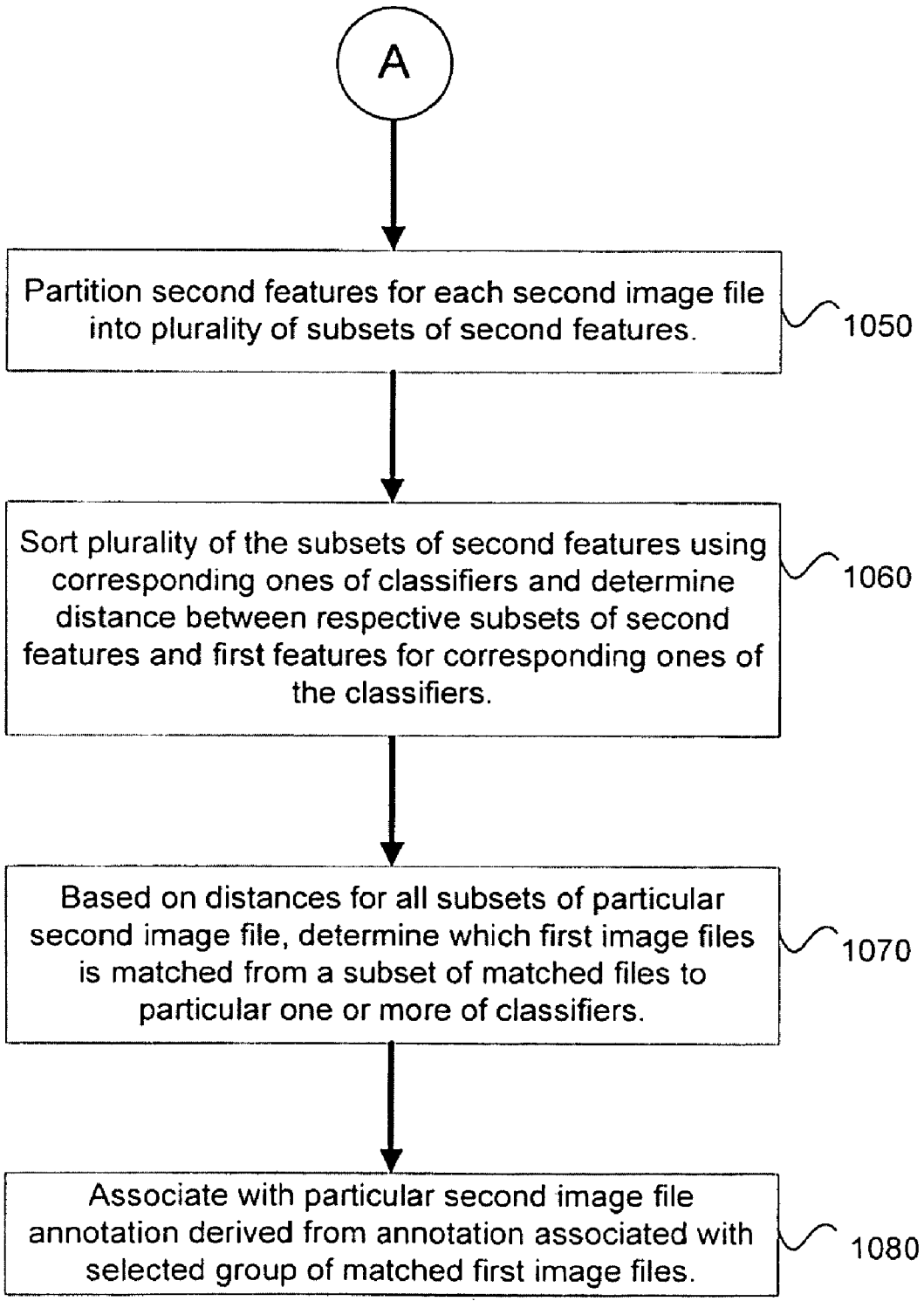

FIGS. 10A-10B is a flow diagram illustrating a method 1000 for implementing media file classification/annotation systems 300, 800 according to other embodiments. In some embodiments, the method 100 includes extracting a plurality of first features from each of a plurality of first image files, each of the first image files having one or more associated annotations (1010). For each of the first image files, the first features are partitioned into a plurality of subsets of the first features (1020). At step 1030, a plurality of classifiers is formed for each of the subsets of the first features. A plurality of second features is extracted from each of a plurality of second image files (1040). For the second image files the second features, at step 1050, are partitioned into a plurality of subsets of the second features, and the plurality of the subsets of the second features is stored using corresponding ones of the classifiers and a distance is determined between respective subsets of the second features and the first features for the corresponding ones of the classifiers at step 1060. Based on distances for all subsets of a particular second image file, the first image files that are a match from a subset of matched files to a particular one or more of the classifiers is determined at step 1070. At step 1080, the particular second image file is associated with one or more annotations derived from an annotation associated with the selected group of matched first image files.

Figure 11:
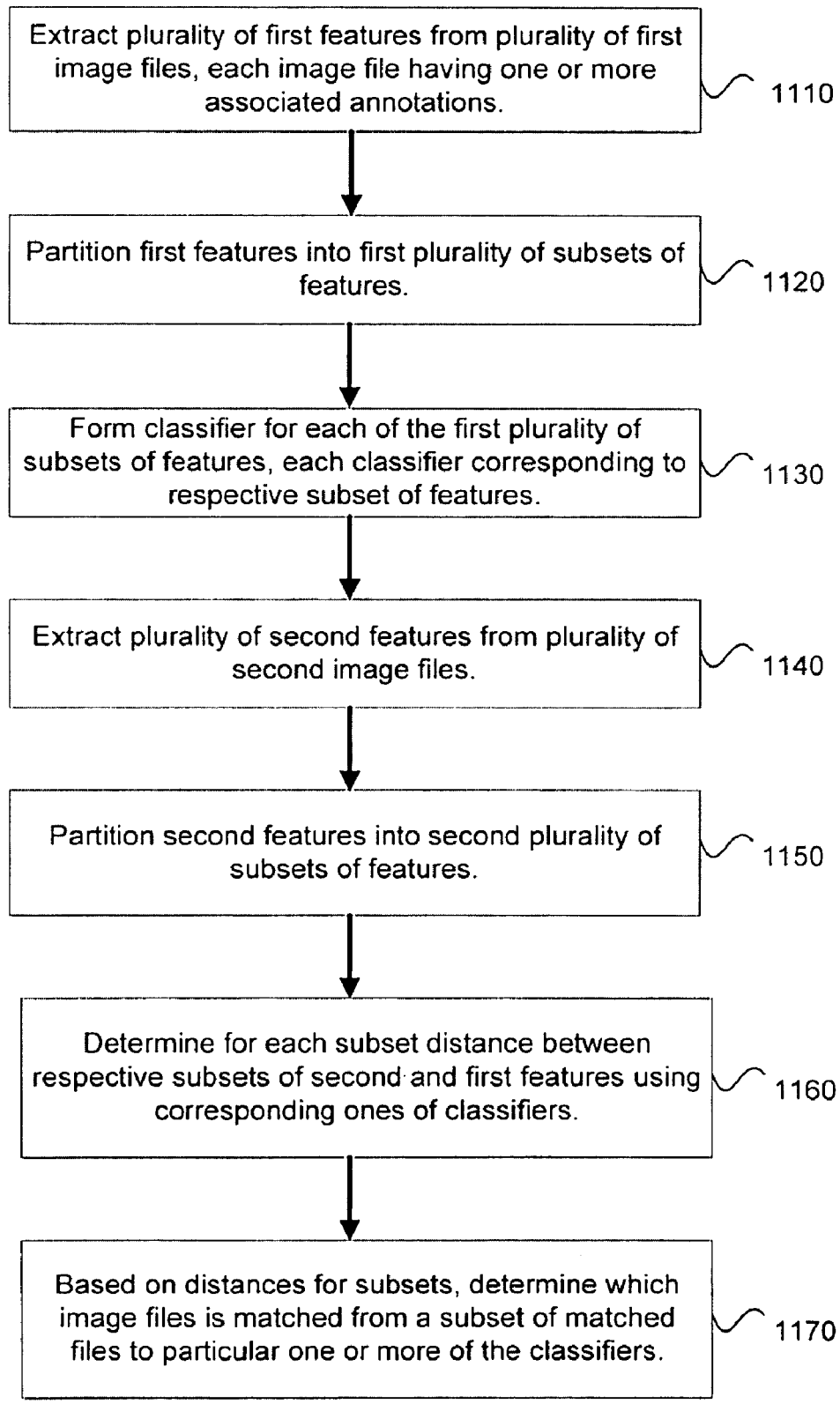
FIG. 11 is a flow diagram illustrating a method of a media file classification system according to yet other embodiments.

FIG. 11 is a flow diagram illustrating a method 1100 of implementing media file classification systems 300, 800 according to yet other embodiments. The method includes extracting a plurality of first features from each of a plurality of first image files, each of the first image files having one or more associated annotations (1110). The method also includes partitioning the first features for each of the first image files into a first plurality of subsets of the features (1120). A classifier is formed for each of the first plurality of subsets of the features, at step 1130, wherein each classifier corresponds to the respective subset of features from each of the plurality of first image files. At step 1140, a plurality of second features from each of a plurality of second image files is extracted, and at step 1150, the second features are partitioned into a second plurality of subsets of features for each of the second image files. At step 1160, for each subset, a distance between respective subsets of the second features and the first features is determined using corresponding ones of the classifiers. Based on distances for subsets of a particular second image file, the image files that are matched from a subset of matched files to a particular one or more of the classifiers is determined at step 1170.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A computer implemented method for annotating digital files, the method comprising:
   at a computer system having one or more processors and memory storing one or more programs that when executed by the one or more processors cause the computer system to perform the method:
   identifying a plurality of first features of a plurality of first digital files having one or more associated annotations;
   partitioning the plurality of first features into a plurality of subsets of the first features, including a respective subset of the first features;
   generating one or more classifiers based on the respective subset of the first features;
   identifying a plurality of second features of a respective second digital file;
   for each respective first digital file of two or more of the plurality of first digital files, determining a distance vector corresponding to a respective partial distance between a representation of features of the respective second digital file and a representation of features of the respective first digital file using a respective classifier;
   identifying a subset of the plurality of first digital files as candidate nearest neighbors to the respective second digital file based on the partial distances;
   determining scores corresponding to full distances between features of a plurality of the candidate nearest neighbors and features of the respective second digital file and ranking the determined scores;

selecting a subset of the candidate nearest neighbors as matched files based on the ranking, wherein the matched files are associated with a respective annotation; and associating the respective annotation with the respective second digital file.

2. The method of claim 1, further comprising:

generating a plurality of classifiers from the plurality of first features;

applying the respective second digital file to the plurality of classifiers and determining a weight value corresponding to each of the plurality of classifiers;

combining the weight values corresponding to one or more of the classifiers; and associating one or more annotations from a respective subset of matched files to the respective second digital file based on the combined weight values.

3. The method of claim 1, wherein the respective second digital file is associated with one or more user-provided annotations, and the method further comprises:

generating a plurality of classifiers from the plurality of first features;

associating one or more annotations to the respective second digital file using corresponding ones of the classifiers;

receiving a third plurality of digital files;

extracting a plurality of third features from at least one of the third plurality of digital files;

partitioning the plurality of third features into a plurality of subsets of the third features;

sorting the plurality of the subsets of the third features using corresponding ones of the classifiers and recalculating a distance between respective subsets of the third features and the second features for corresponding ones of the classifiers;

determining a weight value corresponding to each one of the classifiers based on the recalculated distances; and associating with the at least one of the plurality of third digital files one or more annotations from annotations of a respective subset of the matched files based on one or more of the weight values.

4. The method of claim 3, further comprising:

iteratively updating one or more of the weight values in response to subsequently receiving a digital file having one or more user provided annotations.

5. The method of claim 1, further comprising generating a plurality of classifiers including a plurality of k-dimensional trees wherein selecting the matched files comprises selecting at least ten nearest neighbors based for each one of the plurality of k-dimensional trees.

6. The method of claim 5, wherein associating the respective annotation with the respective second digital file includes determining for each nearest neighbor a vote based on the weight value corresponding to one or more of the respective classifiers, and associating one or more annotations to the respective second digital file based on the vote for each nearest neighbor or a sum of the votes.

7. A non-transitory computer readable storage medium, storing one or more programs for execution by one or more processors, the one or more programs comprising instructions for:

identifying a plurality of first features of a plurality of first digital files having one or more associated annotations;

partitioning the plurality of first features into a plurality of subsets of the first features, including a respective subset of the first features;

generating one or more classifiers based on the respective subset of the first features;

identifying a plurality of second features of a respective second digital file;

for each respective first digital file of two or more of the plurality of first digital files, determining a distance vector corresponding to a respective partial distance between a representation of features of the respective second digital file and a representation of features of the respective first digital file using a respective classifier;

identifying a subset of the plurality of first digital files as candidate nearest neighbors to the respective second digital file based on the partial distances;

determining scores corresponding to full distances between features of a plurality of the candidate nearest neighbors and features of the respective second digital file and ranking the determined scores;

selecting a subset of the candidate nearest neighbors as matched files based on the ranking, wherein the matched files are associated with a respective annotation; and associating the respective annotation with the respective second digital file.

8. The computer readable storage medium of claim 7, wherein the respective second digital file is associated with one or more user provided annotations, and the one or more programs further comprise instructions for:

generating a plurality of classifiers from the plurality of first features;

associating one or more annotations to the respective second digital file using corresponding ones of the classifiers;

receiving a third plurality of digital files;

extracting a plurality of third features from at least one of the third plurality of digital files;

partitioning the plurality of third features into a plurality of subsets of the third features;

sorting the plurality of the subsets of the third features using corresponding ones of the classifiers and recalculating a distance between respective subsets of the third features and the second features for corresponding ones of the classifiers;

determining a weight value corresponding to each one of the classifiers based on the recalculated distances; and associating with the at least one of the plurality of third digital files one or more annotations from annotations of a respective subset of the matched files based on one or more of the weight values.

9. The computer readable storage medium of claim 8, wherein the one or more programs further comprise instructions for:

iteratively updating one or more of the weight values in response to subsequently receiving a digital file having one or more user provided annotations.

10. The computer readable storage medium of claim 7, wherein the one or more programs further comprise instructions for:

generating a plurality of classifiers from the plurality of first features;

applying the respective second digital file to the plurality of classifiers and determining a weight value corresponding to each of the plurality of classifiers;

combining the weight values corresponding to one or more of the classifiers; and associating one or more annotations from a respective subset of matched files to the respective second digital file based on the combined weight values.

11. The computer readable storage medium of claim 7, wherein:
the one or more programs further comprise instructions for generating a plurality of classifiers including a plurality of k-dimensional trees; and
selecting the matched files comprises selecting at least ten nearest neighbors based for each one of the plurality of k-dimensional trees.

12. The computer readable storage medium of claim 11, wherein associating the respective annotation with the respective second digital file includes determining for each nearest neighbor a vote based on the weight value corresponding to one or more of the respective classifiers, and associating one or more annotations to the respective second digital file based on the vote for each nearest neighbor or a sum of the votes.

13. A computer system comprising:
one or more processors;
memory; and
one or more software modules stored in the memory and executable by the one or more processors comprising instructions for:
identifying a plurality of first features of a plurality of first digital files having one or more associated annotations;
partitioning the plurality of first features into a plurality of subsets of the first features, including a respective subset of the first features;
generating one or more classifiers based on the respective subset of the first features;
identifying a plurality of second features of a respective second digital file;
for each respective first digital file of two or more of the plurality of first digital files, determining a distance vector corresponding to a respective partial distance between a representation of features of the respective second digital file and a representation of features of the respective first digital file using a respective classifier;
identifying a subset of the plurality of first digital files as candidate nearest neighbors to the respective second digital file based on the partial distances;
determining scores corresponding to full distances between features of a plurality of the candidate nearest neighbors and features of the respective second digital file and ranking the determined scores;
selecting a subset of the candidate nearest neighbors as matched files based on the ranking, wherein the matched files are associated with a respective annotation; and
associating the respective annotation with the respective second digital file.

14. The computer readable storage medium of claim 7, wherein the respective second digital file is associated with one or more user provided annotations, and the one or more software modules further comprise instructions for:
generating a plurality of classifiers from the plurality of first features;
associating one or more annotations to the respective second digital file using corresponding ones of the classifiers;
receiving a third plurality of digital files;
extracting a plurality of third features from at least one of the third plurality of digital files;
partitioning the plurality of third features into a plurality of subsets of the third features;
sorting the plurality of the subsets of the third features using corresponding ones of the classifiers and recalculating a distance between respective subsets of the third features and the second features for corresponding ones of the classifiers;
determining a weight value corresponding to each one of the classifiers based on the recalculated distances; and
associating with the at least one of the plurality of third digital files one or more annotations from annotations of a respective subset of the matched files based on one or more of the weight values.

15. The computer readable storage medium of claim 14, wherein the one or more software modules further comprise instructions for:
iteratively updating one or more of the weight values in response to subsequently receiving a digital file having one or more user provided annotations.

16. The computer readable storage medium of claim 15, wherein the one or more software modules further comprise instructions for:
generating a plurality of classifiers from the plurality of first features;
applying the respective second digital file to the plurality of classifiers and determining a weight value corresponding to each of the plurality of classifiers;
combining the weight values corresponding to one or more of the classifiers; and
associating one or more annotations from a respective subset of matched files to the respective second digital file based on the combined weight values.

17. The computer readable storage medium of claim 15, wherein:
the one or more programs further comprise instructions for generating a plurality of classifiers including a plurality of k-dimensional trees; and
selecting the matched files comprises selecting at least ten nearest neighbors based for each one of the plurality of k-dimensional trees.

18. The computer readable storage medium of claim 17, wherein associating the respective annotation with the respective second digital file includes determining for each nearest neighbor a vote based on the weight value corresponding to one or more of the respective classifiers, and associating one or more annotations to the respective second digital file based on the vote for each nearest neighbor or a sum of the votes.

* * * * *